(12) United States Patent
Hoefler

(10) Patent No.: US 12,358,677 B2
(45) Date of Patent: Jul. 15, 2025

(54) BULK CONTAINER DISCHARGE STATION AND RELATED METHODS

(71) Applicant: HaF Equipment LLC, Maplewood, MN (US)

(72) Inventor: Peter Hoefler, Maplewood, MN (US)

(73) Assignee: HaF Equipment LLC, Maplewood, MN (US)

( * ) Notice: Subject to any disclaimer, the term of this patent is extended or adjusted under 35 U.S.C. 154(b) by 326 days.

(21) Appl. No.: 17/460,450

(22) Filed: Aug. 30, 2021

(65) Prior Publication Data

US 2021/0387762 A1    Dec. 16, 2021

Related U.S. Application Data

(63) Continuation of application No. PCT/US2020/022865, filed on Mar. 15, 2020.
(Continued)

(51) Int. Cl.
*B65B 69/00* (2006.01)

(52) U.S. Cl.
CPC ...... *B65B 69/0091* (2013.01); *B65B 69/0058* (2013.01); *B65B 69/0008* (2013.01); *B65B 69/0083* (2013.01)

(58) Field of Classification Search
CPC ............ B65B 69/0058; B65B 69/0075; B65B 69/0083; B65B 69/0091
(Continued)

(56) References Cited

U.S. PATENT DOCUMENTS 3,638,804 A * 2/1972 Blakeway ............. B60P 1/5428
212/292
3,876,088 A * 4/1975 Klaus .................... B60P 1/6472
414/547
(Continued)

FOREIGN PATENT DOCUMENTS

DE         4303261 A1    8/1994
DE    1020005005018     10/2005
(Continued)

OTHER PUBLICATIONS

European Search Report dated Nov. 15, 2022 in European Patent Application No. 20770907.
(Continued)

*Primary Examiner* — James Keenan
(74) *Attorney, Agent, or Firm* — DeWitt LLP; Brian R. Pollack, Esq.

(57) ABSTRACT

The disclosure provides a bulk container discharge apparatus and related methods. An illustrative, non-limiting example of such an apparatus includes a base portion, a platform disposed on the base portion, the platform being configured to support a bulk container, and at least one articulating arm. The at least one articulating arm can have a first portion that is pivotally coupled to the base portion at a first pivot. The at least one articulating arm can be configured to lift a bulk container along a loading path (such as but not limited to an arcuate path) that is at least partially vertical from a lower position to an upper position to place the bulk container over the platform when in the articulating arm is in the upper position to facilitate discharging the contents of the bulk container.

24 Claims, 30 Drawing Sheets

Related U.S. Application Data

(60) Provisional application No. 62/818,737, filed on Mar. 14, 2019.

(58) Field of Classification Search
USPC .................................................. 414/547, 719
See application file for complete search history.

(56) References Cited

U.S. PATENT DOCUMENTS

| | | | | |
|---|---|---|---|---|
| 4,032,138 A * | 6/1977 | Willis | ..................... | A63G 9/08 |
| | | | | 472/16 |
| 4,527,716 A | 7/1985 | Haas et al. | | |
| 4,921,394 A * | 5/1990 | Watson | ................. | B60P 1/6472 |
| | | | | 414/547 |
| 5,322,095 A | 6/1994 | Bolz | | |
| 6,089,670 A * | 7/2000 | Rogers | .................... | B60P 1/486 |
| | | | | 414/500 |
| 6,283,699 B1 * | 9/2001 | Simpson | ............... | B60P 1/6472 |
| | | | | 414/547 |
| 6,851,915 B2 * | 2/2005 | Warner | .................... | B66F 9/122 |
| | | | | 414/667 |
| 7,223,058 B2 * | 5/2007 | Nyhof | ................. | B65B 69/0091 |
| | | | | 414/415 |
| 7,287,946 B2 * | 10/2007 | Bonerb | ............... | B65B 69/0091 |
| | | | | 414/412 |
| 9,050,924 B2 * | 6/2015 | Scherf | .................... | B60P 1/483 |
| 9,126,523 B2 * | 9/2015 | Ogita | .................... | B60P 1/5428 |
| 10,093,481 B2 * | 10/2018 | Snape | ................. | B65B 69/0091 |
| 10,232,757 B2 * | 3/2019 | Sawatzky | ............. | B60P 1/4414 |
| 2003/0206790 A1 | 11/2003 | Nyhof | | |
| 2012/0301260 A1 | 11/2012 | Bonora | | |
| 2016/0114972 A1 | 4/2016 | Snape | | |
| 2021/0375653 A1 | 12/2021 | Kuo | | |

FOREIGN PATENT DOCUMENTS

| | | | | |
|---|---|---|---|---|
| DE | 102009020600 A1 * | 11/2010 | ......... | B65B 69/0083 |
| FR | 2797438 A1 * | 2/2001 | ......... | B65B 69/0075 |
| RU | 2039685 C1 | 3/1995 | | |
| RU | 2280003 C1 | 6/2006 | | |
| RU | 2381171 C1 | 2/2010 | | |
| SU | 850535 A1 | 7/1981 | | |

OTHER PUBLICATIONS

Written Opinion mailed Jun. 18, 2020 in PCT/US2020/022865.
International Search Report mailed Jun. 18, 2020 in PCT/US2020/022865.
Rule 132 Declaration dated Nov. 14, 2024 filed in U.S. Appl. No. 17/460,450.

* cited by examiner

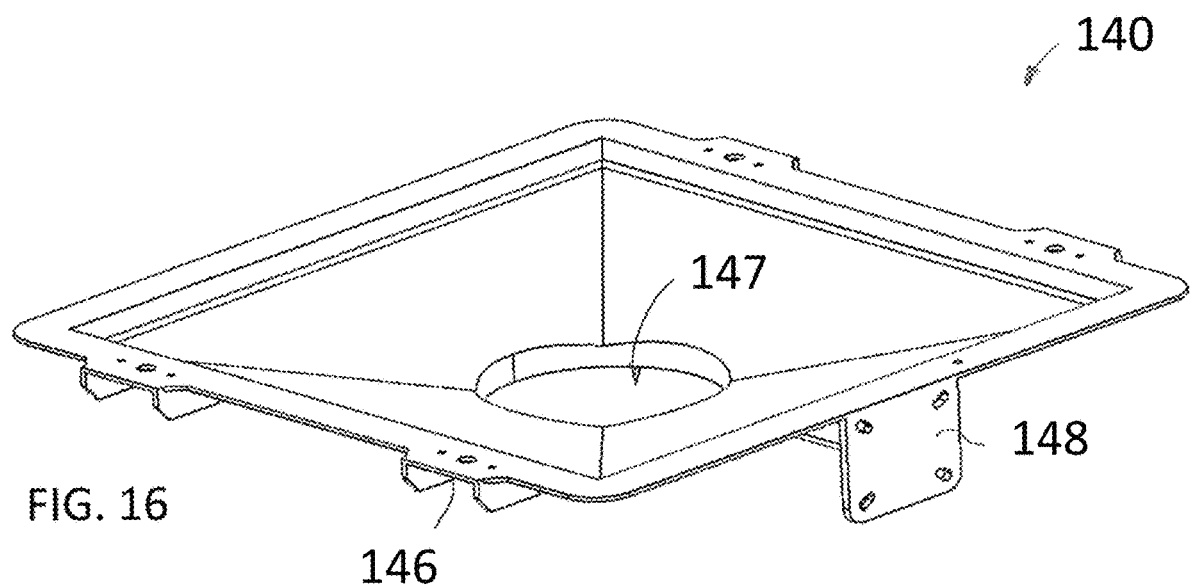
FIG. 16
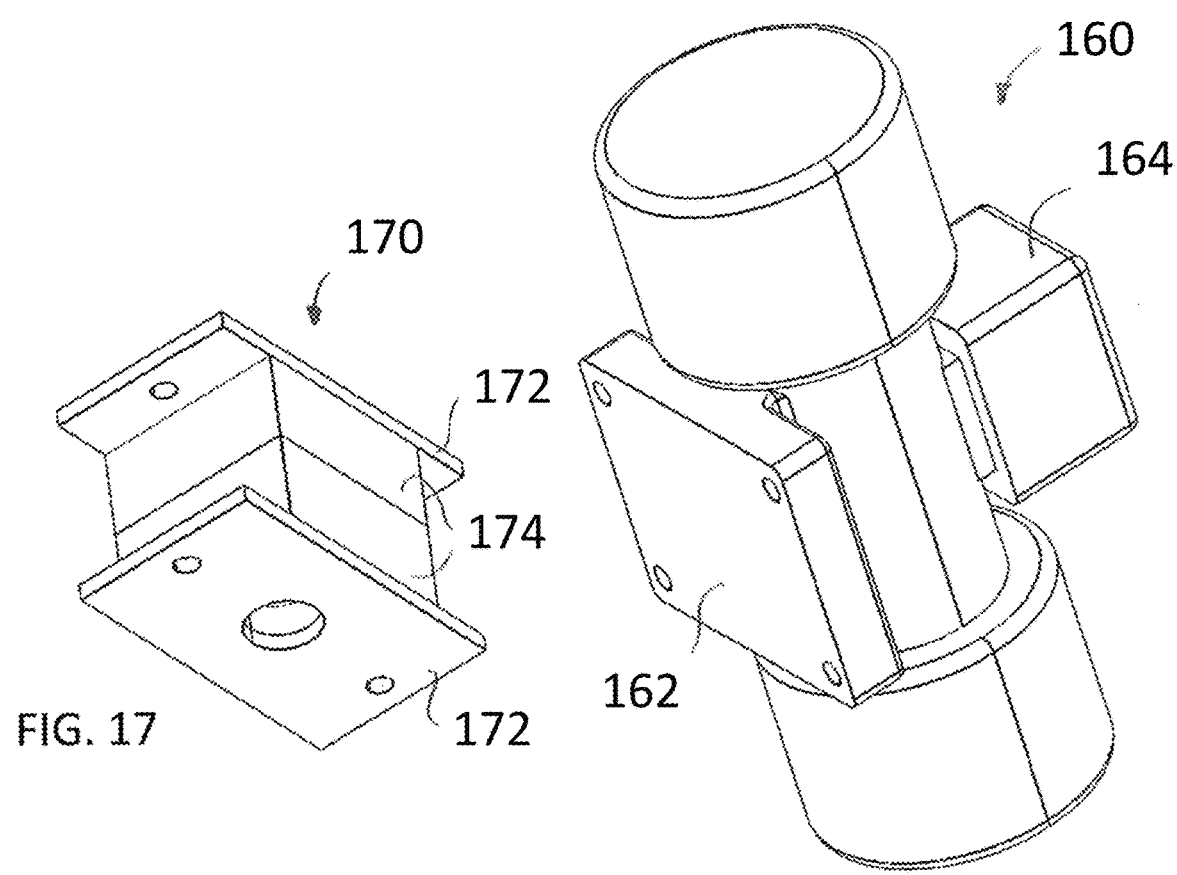
FIG. 17
FIG. 18

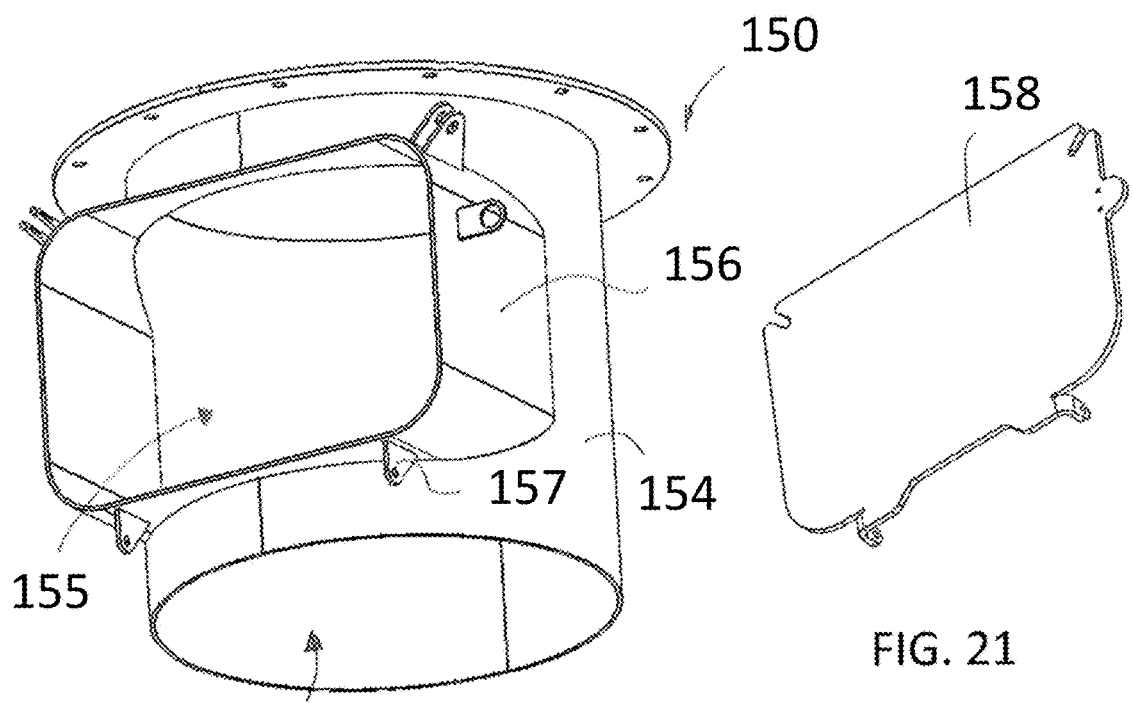
FIG. 19
FIG. 21
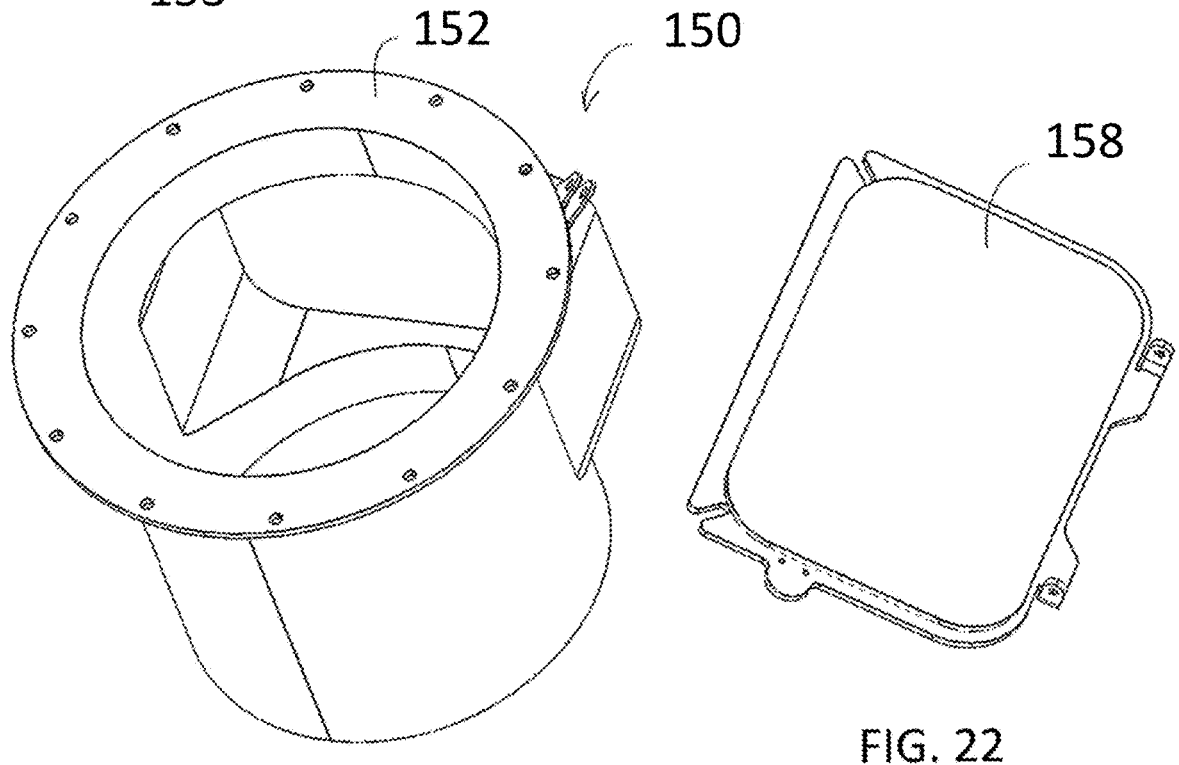
FIG. 20
FIG. 22

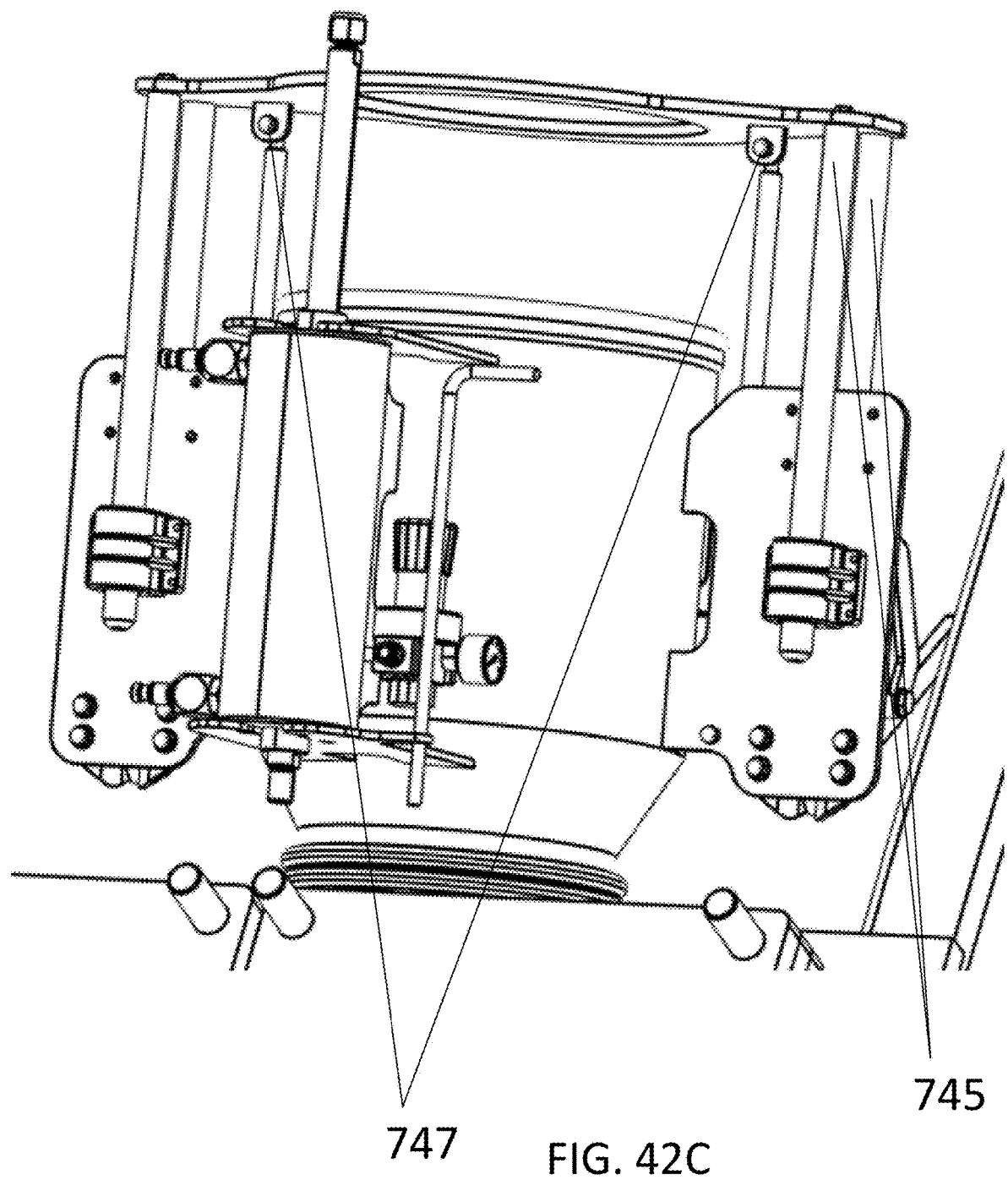
747  FIG. 42C  745

BULK CONTAINER DISCHARGE STATION AND RELATED METHODS

CROSS-REFERENCE TO RELATED APPLICATIONS

The present patent application is a continuation of and claims the benefit of priority to International Patent Application No. PCT/US20/22865, filed Mar. 15, 2020, which in turn claims the benefit of U.S. Provisional Patent Application Ser. No. 62/818,737, filed Mar. 14, 2019. Each of the aforementioned patent applications is hereby incorporated by reference in its entirety for any purpose whatsoever.

BACKGROUND

Powered and granular products, such a sugar, flour, plastic pellets, etc. are commonly packaged, shipped, and dispensed on a commercial scale using bulk bags capable of retaining from about 15 ft3 up to about 100 ft3 of product. Bulk bags are available from a number of suppliers, including Bulk Sak, Inc. of Malvern, Arkansas, National Packaging Services, Inc. of Hackensack, New Jersey, and B.A.G. Corp of Dallas, Texas.

Bulk bags are commonly equipped with four loading loops, including one at each upper "corner" to facilitate loading of the bulk bag onto a discharge platform for dispensing product from the bag through a discharge spout in the bottom of the bag.

Bulk bag discharge stations are typically equipped with a gantry crane for loading bulk bags onto the discharge platform of the station. While effective for quickly and efficiently loading bulk bags, gantry cranes are bulky, hazardous to operate as the bulk bags—often weighing a thousand pounds or more—tend to sway significantly while suspended from the crane, and suffer from the disadvantage that they include moving parts positioned directly above the bulk bag as it is being loaded, thereby causing lubricants and/or metal grindings to periodically fall into the product retained within the bulk bag when the top of the bag is open.

Accordingly, a substantial need exists for a compact bulk bag discharge station that avoids the safety concerns and potential for product contamination presented by the use of a gantry crane to load the bulk bags onto the discharge platform.

SUMMARY

Aspects of the present disclosure relate to, among other things, bulk container discharge stations for unloading bulk containers, such as bags. It may be understood that both the foregoing general description and the following detailed description are exemplary and explanatory only and are not restrictive of the features claimed. As used herein, the terms "comprises," "comprising," or any other variation thereof, are intended to cover a non-exclusive inclusion such that a process, method, article, or apparatus that comprises a list of elements does not necessarily include only those elements, but may include other elements not expressly listed or inherent to such process, method, article, or apparatus. The term "exemplary" is used in the sense of "example," rather than "ideal."

Thus, in some aspects, the disclosure provides a bulk container discharge apparatus. An illustrative, non-limiting example of such an apparatus includes a base portion, a platform disposed on the base portion, the platform being configured to support a bulk container, and at least one articulating arm. The at least one articulating arm can have a first portion that is pivotally coupled to the base portion at a first pivot. The at least one articulating arm can be configured to lift a bulk container along a loading path (such as but not limited to an arcuate path) that is at least partially vertical from a lower position to an upper position to place the bulk container over the platform when in the articulating arm is in the upper position to facilitate discharging the contents of the bulk container. The apparatus further includes an articulation drive that is coupled to the base portion and to the at least one articulating arm. The articulation drive is configured to articulate the at least one articulating arm about the first pivot.

In some implementations, the bulk container discharge apparatus can further include a yoke coupled to the articulating arm. The yoke can be coupled to a second portion of the articulating arm. The yoke can be configured and arranged to carry the bulk container. If desired, the yoke can be pivotally coupled to the articulating arm. The yoke can be configured to maintain the bulk container in a level orientation while it is being lifted.

In some embodiments, the bulk container discharge apparatus can further include a linear drive coupled to the at least one articulating arm. The linear drive can be configured to raise and lower the bulk container along a vertical direction after the articulating drive has articulated the at least one articulating arm to the upper position. If desired, the bulk container discharge station can further include a vibrator coupled to the platform. The vibrator can be configured to induce mechanical vibration in the platform to facilitate emptying of the bulk container. If desired, the bulk container discharge station can further include at least one vibration isolator. The vibration isolator can, for example, couple the platform to the base portion to limit vibration from the vibrator from traveling to the base portion, or other location, as desired.

In some embodiments, the bulk container discharge apparatus includes a pair of articulating arms as set forth herein. Each of the articulating arms can be located on opposing sides of the platform and be coupled to the yoke.

In some implementations, the bulk container discharge apparatus can further include a linear drive configured to raise and lower the bulk container when the bulk container is suspended above the platform. Additionally or alternatively, the apparatus can include a linear drive or other mechanism to raise and lower the platform to bring the platform into contact with the bulk container.

The bulk container discharge apparatus can further include one or more processors operably coupled to various components, such as the articulation drive and/or the linear drive. When a plurality of articulation drives and/or linear drives are provided, the processor can be configured to synchronize the movement of each of the linear drives and/or articulation drives to maintain the bulk container in a level condition, or to purposely orient the bulk container in an orientation that is not level, such as to help empty the container while it is discharging. For example, in some embodiments, the bulk container discharge apparatus can further include a plurality of linear position sensors coupled to the processor that detect the vertical position of the yoke, and further wherein the processor is configured to recognize when the yoke is not level. The one or more processors can be operably coupled to the articulation drive and/or linear drive to control their movement. In some implementations, the articulation drive can include two discrete linear drives, and the processor can be further configured to synchronize the movements of the two discrete linear drives of the articulation drive to cause the apparatus to maintain the bulk container in a level condition when it is being articulated. In some embodiments, the processor can be configured to lift a portion of the bulk container is it is being emptied in order to maintain tension on at least one sidewall of the bulk container.

Various methods of emptying bulk containers are provided. An illustrative, non-limiting method can include providing a bulk container discharge apparatus as described herein, for example, then coupling a bulk container to the yoke of the discharge apparatus. The method further includes lifting the bulk container along the articulation path, lowering the bulk container onto the platform, and opening the bulk container in order to empty it.

In some embodiments, the method can include lifting at least a portion of the bulk container is it is being emptied in order to maintain tension on at least one sidewall of the bulk container. The method can optionally include moving at least a portion of the bulk container upward and downward, along orientations where the container is level and/or not level in order to facilitate emptying the container. The method can further include articulating a support underneath the bulk container to push up on the bottom of the bulk container to cause material to flow toward an exit of the bulk container. The articulation path can be controllably adjusted in a two dimensional plane that is parallel to a lateral side of the device. The articulation path can be adjusted to maintain minimal stress on the articulation drive by maintaining the bulk container in a close positional relationship to the device while it is being lifted.

If desired, the platform of the apparatus can be articulable to direct contents toward a center of the bulk container. In some implementations, the apparatus can include a single articulation drive on one side of the apparatus.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

FIG. 16 is a top rear isometric view of the bag pan of FIG. 14.

FIG. 17 is a isometric view of an illustrative vibration isolator for coupling the bag pan of FIG. 14 to the remainder of the bulk container discharge apparatus of FIG. 1.

FIG. 18 is a front top isometric view of a vibrator that can be coupled to a rear flange of the bag pan of FIG. 14.

FIG. 19 is a bottom front isometric view of a glove box portion of the bulk container discharge apparatus of FIG. 1.

FIG. 20 is a top rear isometric view of a glove box portion of the bulk container discharge apparatus of FIG. 19.

FIG. 21 is a front bottom isometric view of a removable cover for the glove box of FIG. 20.

FIG. 22 is a rear isometric view of a removable cover for the glove box of FIG. 20.

FIGS. 42A-42C are various isometric views of selected components of the bulk container discharge apparatus of FIG. 39.

DETAILED DESCRIPTION

The present disclosure is drawn, in various implementations, to bulk container discharge systems and related methods. Reference now will be made in detail to aspects of the present disclosure, examples of which are illustrated in the accompanying drawings. Wherever possible, the same reference numbers will be used throughout the drawings to refer to the same or like parts. The term "distal" refers to a portion farthest away from a user when introducing a device into a subject. By contrast, the term "proximal" refers to a portion closest to the user when placing the device into the subject. The term "approximately," when used to describe a numerical value, may be anywhere in a range of ±5% from the numerical value.

Figure 1:
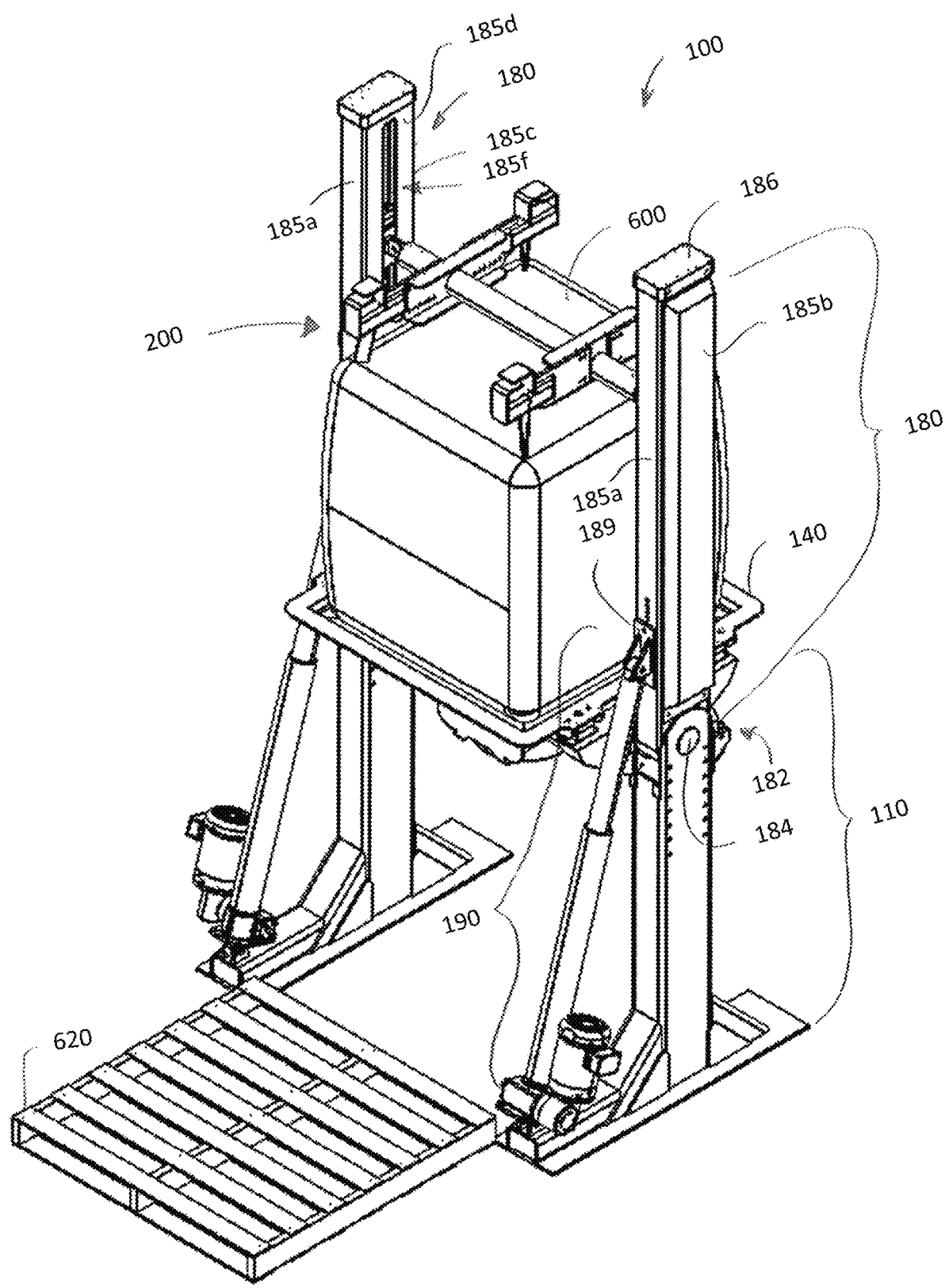
FIG. 1 is a isometric front view of a bulk container discharge apparatus, in accordance with aspects of the present disclosure.

For purposes of illustration, and not limitation, an illustrative, non-limiting example of a bulk container discharge apparatus 100 is presented in FIG. 1. Also presented in FIG. 1 are a bulk container 600 and a skid or pallet 620.

Figure 32:
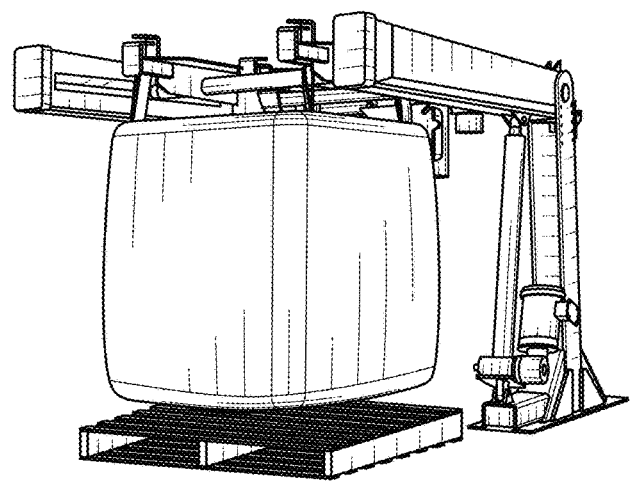
FIGS. 32-36 illustrate the bulk container discharge apparatus of FIG. 1 lifting a bulk container along a sequence of positions in the lifting process.
Figure 33:
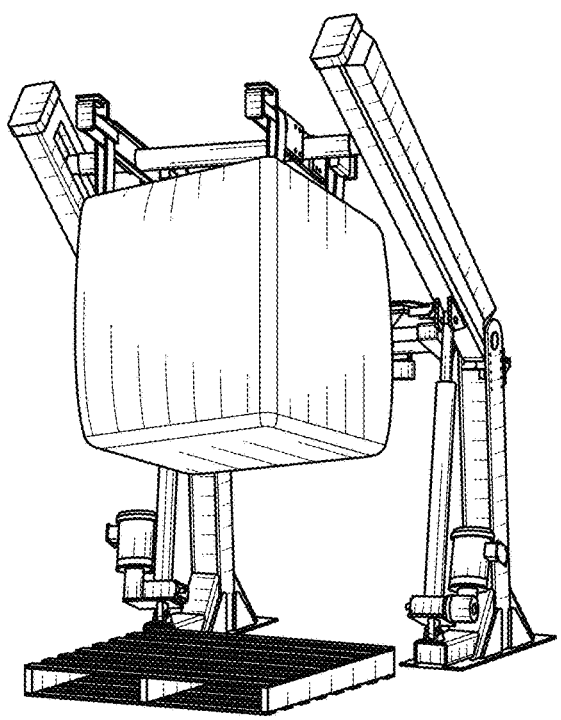
Figure 34:
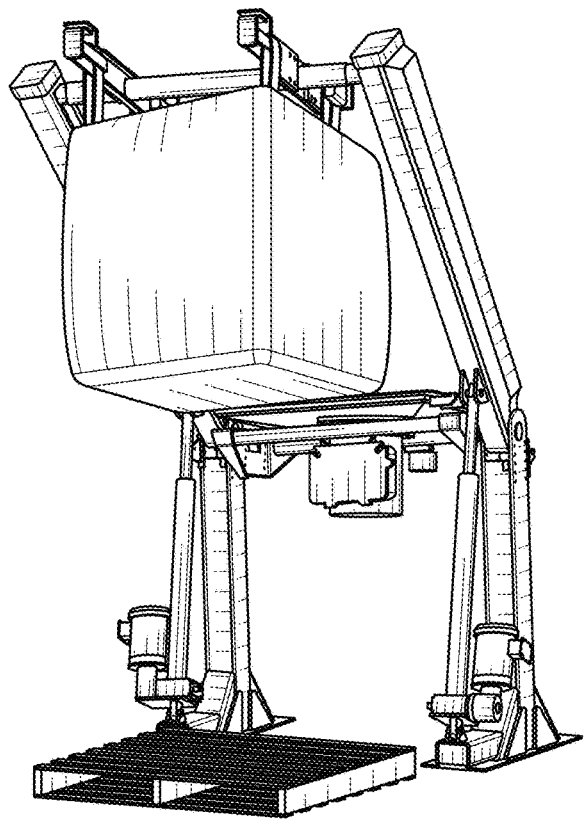

As illustrated, the apparatus 100 includes a base portion 110, a platform 140 disposed on the base portion, the platform being configured to support a bulk container, and at least one articulating arm 180. The at least one articulating arm 180 (illustrated herein as two arms on either side of the platform 140) can have a first portion 182 that is pivotally coupled to the base portion at a first pivot 184. The at least one articulating arm 180 can be configured to lift a bulk container 600 along a loading path (such as but not limited to an arcuate path, as with the embodiment of FIG. 1) that is at least partially vertical from a lower position (FIG. 32) to an upper position (FIG. 36) to place the bulk container 600 over the platform 140 when in the articulating arm 180 is in the upper position to facilitate discharging the contents of the bulk container 600, in this case, through a hole in the center of the platform 140, discussed further below. The apparatus 100 further includes an articulation drive 190 that is coupled to the base portion 110 and to the at least one articulating arm 180. The articulation drive 190 is configured to articulate the at least one articulating arm 180 about the first pivot 184.

In some implementations, the bulk container discharge apparatus 100 can further include a yoke 200 coupled to the articulating arm(s) 180. The yoke 200 can be coupled to a second portion of the articulating arm 180. In FIG. 1, the yoke 200 is pivotally connected to each articulating arm 180 at an end of linear actuators 214 that are housed within arms 180. Particularly, the outer housing plates 185 of each arm surround and define an outer surface of each arm. Each arm, as depicted, includes a plurality of sides 185a, b, c, d, which can include one or more of an outer facing side 185b, front 185a and back 185c facing sides, and an inwardly facing side 185d defining a longitudinal groove 185e along its length for permitting the passage of a central shaft of the yoke 200 into bearing blocks 212 that have wheels or castors 212g that ride along the inner surfaces of the front and rear exterior walls 185 of the arms 180. Each bearing block 212 is illustrated as being coupled to an end of a linear actuator 214.

The yoke 200, as illustrated, is configured and arranged to carry the bulk container 600. Preferably, the yoke 200 is pivotally coupled to each articulating arm 180. Preferably, the yoke 200 is configured to maintain the bulk container in a level orientation while it is being lifted as depicted in FIGS. 32-36.

Figure 2:
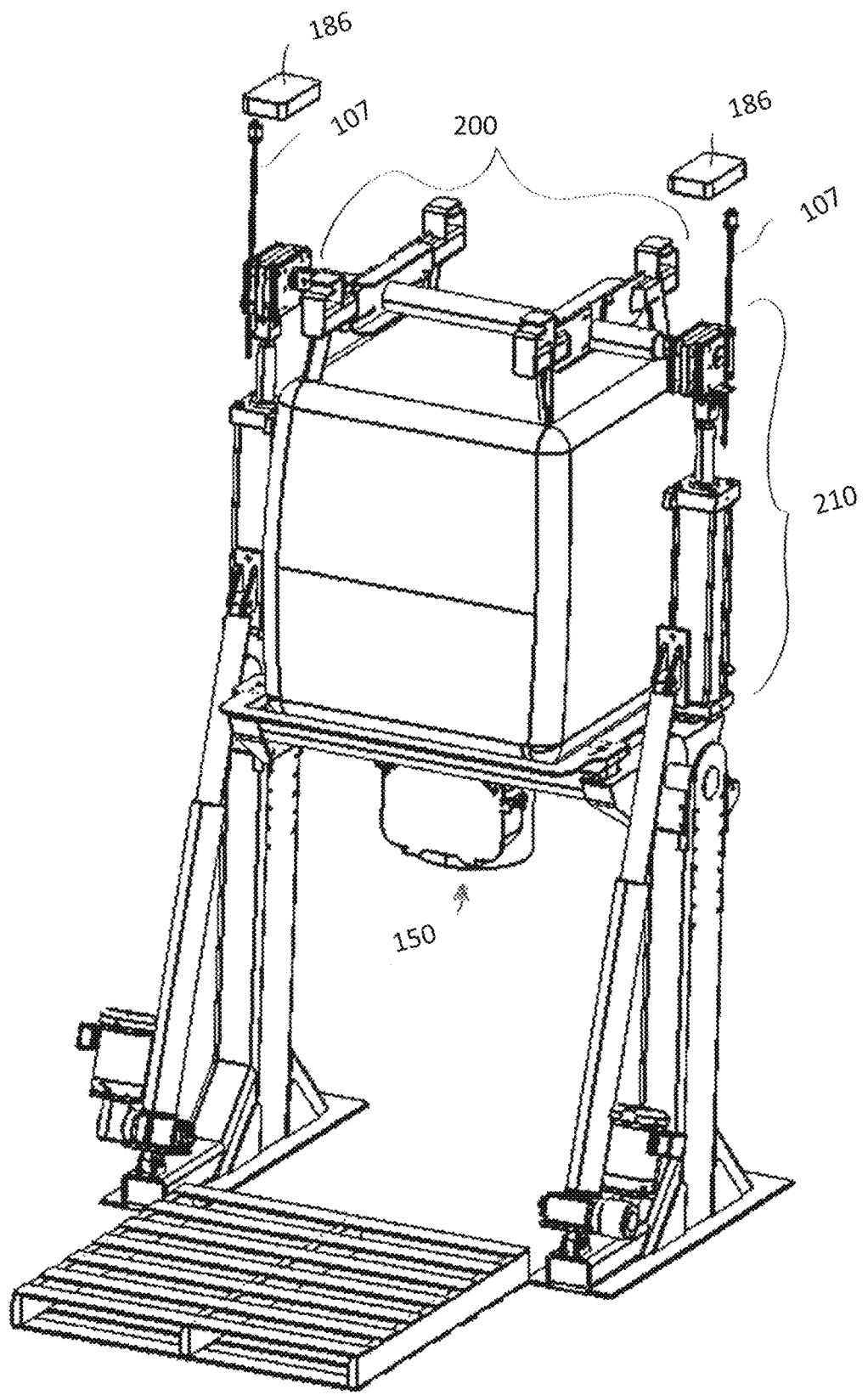
FIG. 2 is a isometric front view of the bulk container discharge apparatus of FIG. 1 with certain external housing portions removed to reveal inner workings of the system.
Figure 3:
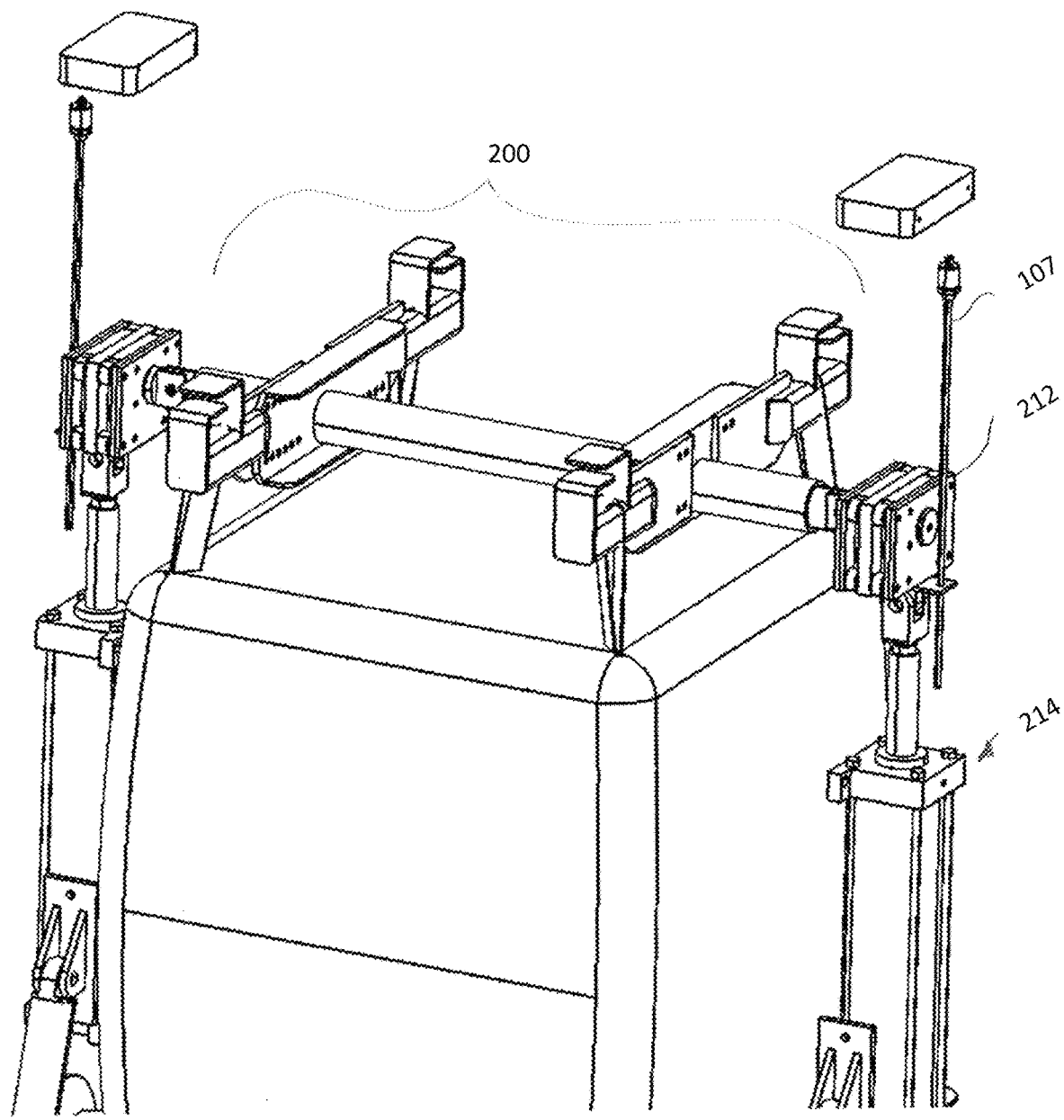
FIG. 3 is a isometric enlarged front view of the bulk container discharge apparatus of FIG. 1 with certain external housing portions removed as set forth in FIG. 2.
Figure 4:
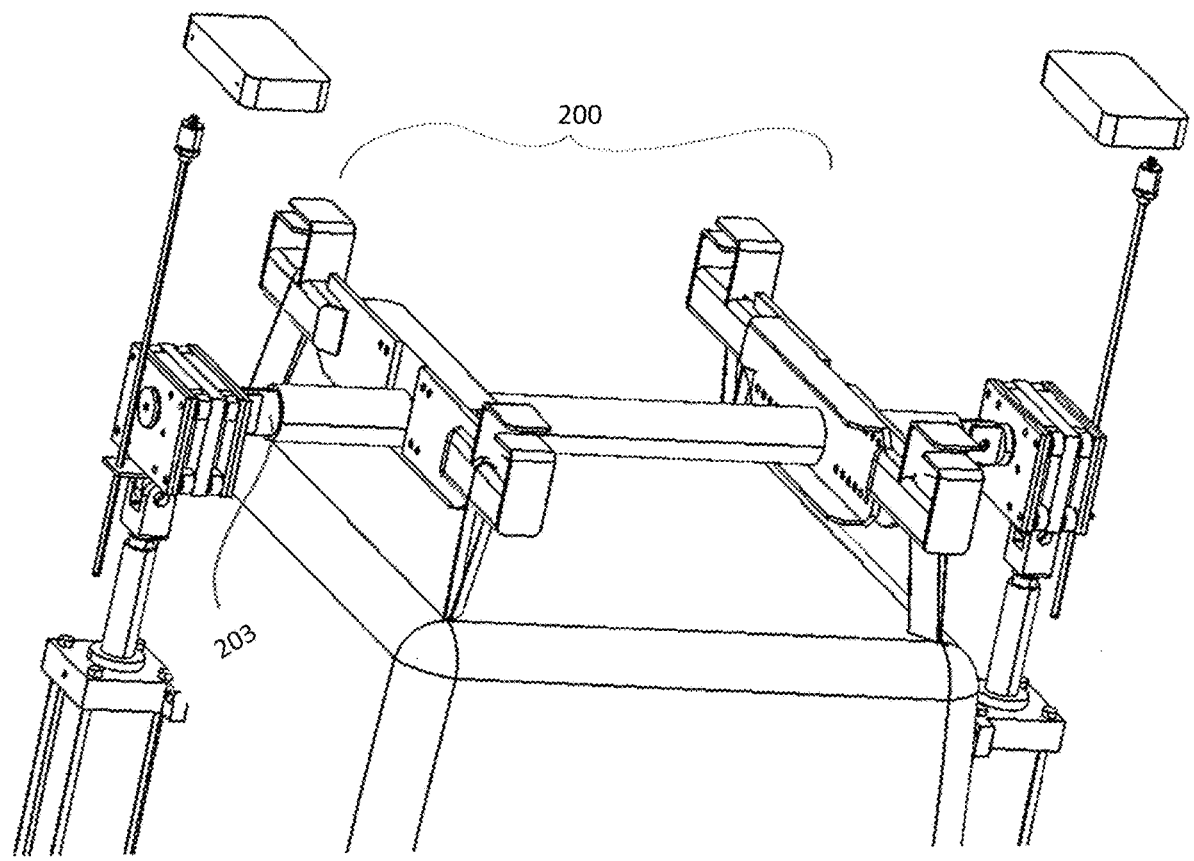
FIG. 4 is a isometric enlarged rear view of the bulk container discharge apparatus of FIG. 1 with certain external housing portions removed.
Figure 5:
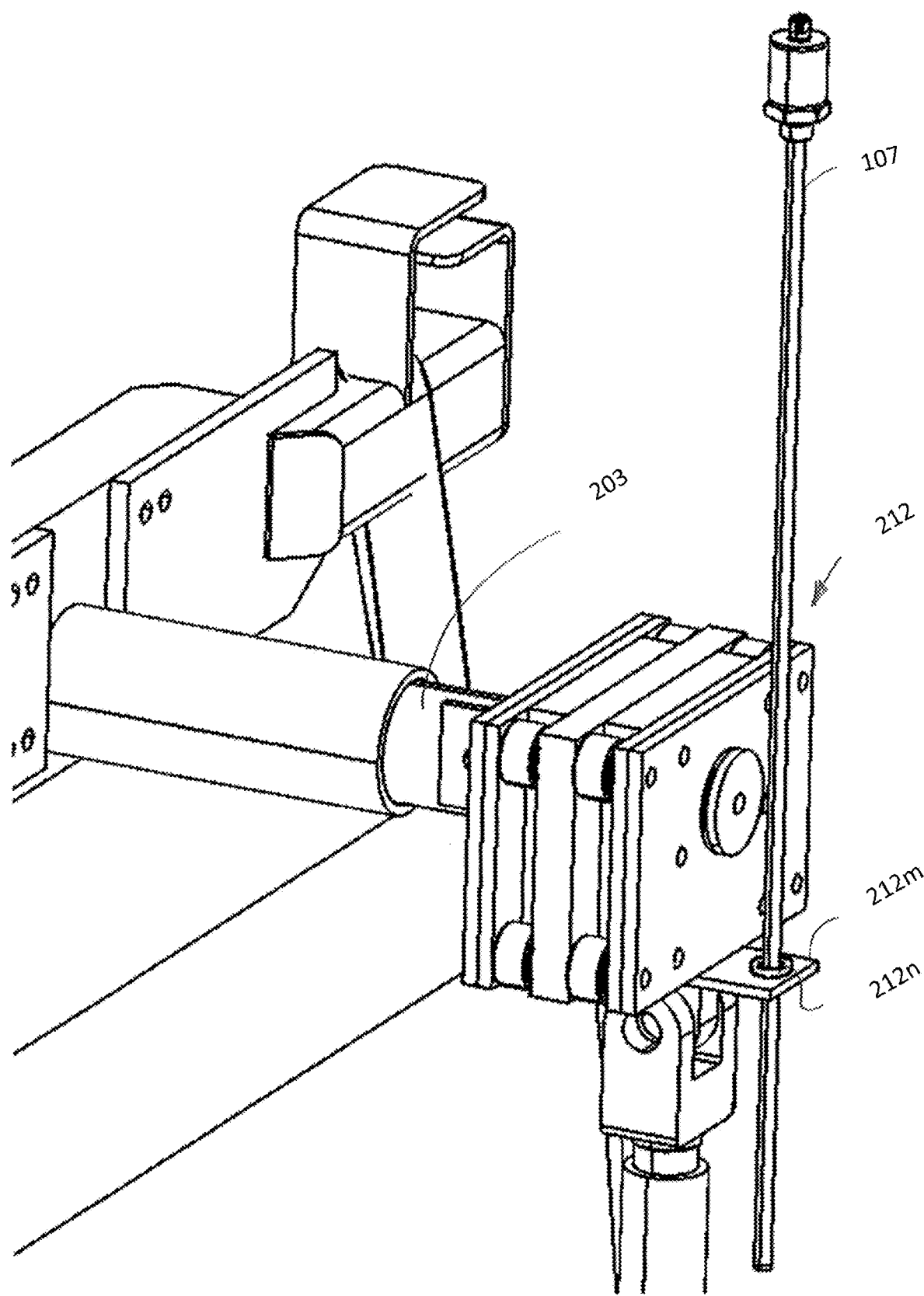
FIG. 5 is a isometric front view of an upper portion of the bulk container discharge apparatus of FIG. 1.
Figure 6:
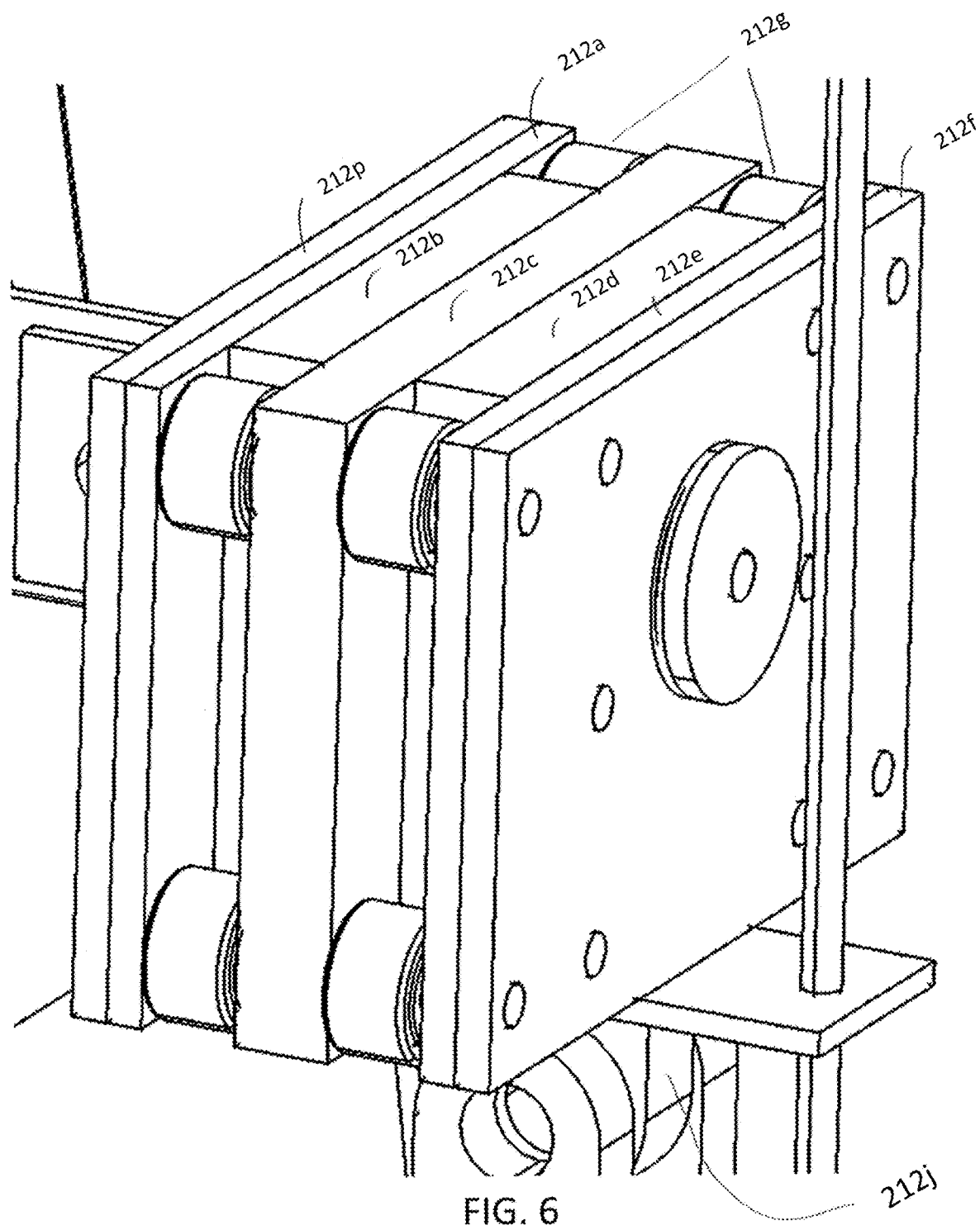
FIG. 6 is a further enlarged isometric front view of an upper portion of the bulk container discharge apparatus of FIG. 1 illustrating a close up view of a wheeled carrier that rolls along an interior housing portion of an articulating arm of the apparatus.

With reference to FIGS. 2 and 3, the apparatus 100 is depicted with the outer housing plates 185 removed, revealing the components underneath. Illustrated are a linear actuator assembly 210, wherein one is provided on each side of the device, that includes a bearing block 212 pivotally coupled to the yoke, a linear proximity switch coupled to a processor via a cable (not shown) that detects the position of the bearing block by way of a magnet (illustrated as a ring shaped permanent magnet 212n, see FIG. 5) attached to a flange 212m at a bottom outwardly extending plate through which the linear proximity switch 107 passes as the yoke 200 is raised and lowered by the linear actuators 214. End caps 186 of arms 180 are illustrated for point of reference. Material is dispensed from the bulk container by way of an opening through the platform and a glove box 150 exit chute, discussed in further detail below.

Figure 7:
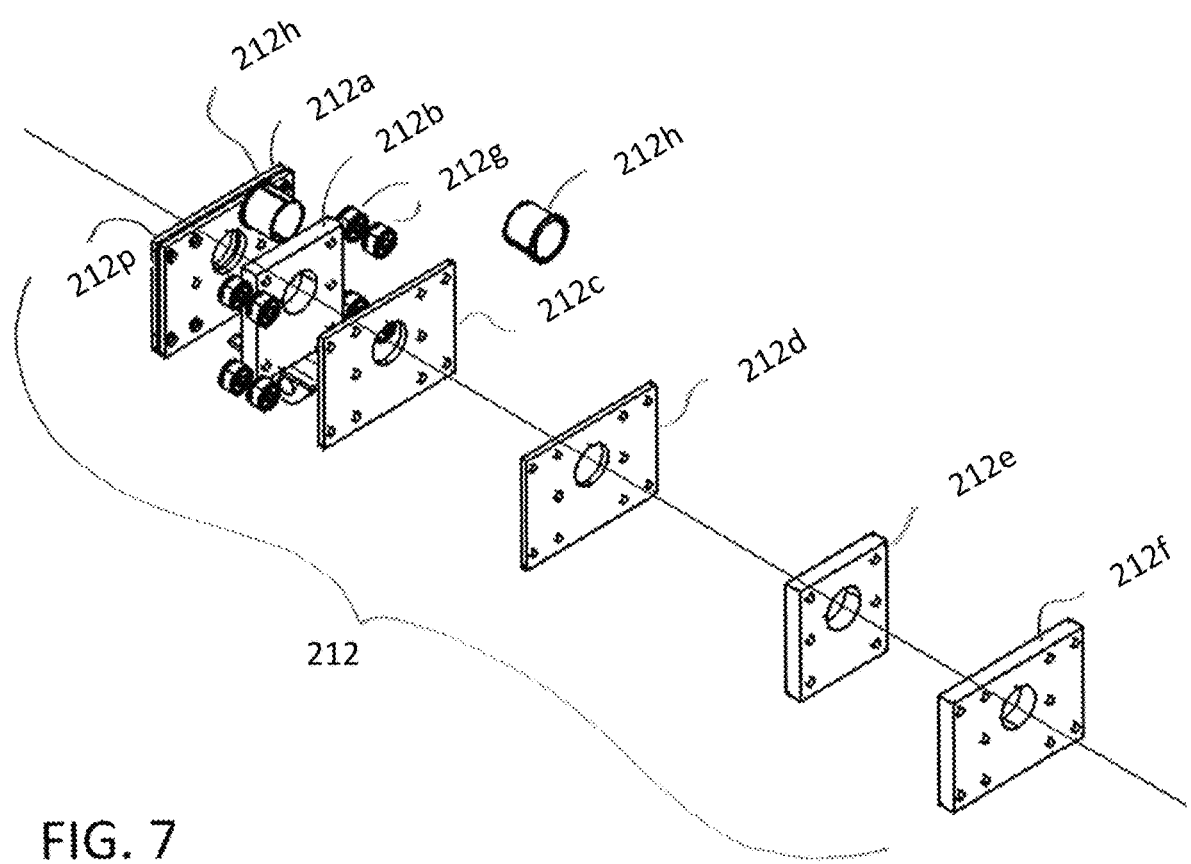
FIG. 7 is an exploded view of the wheeled carrier depicted in FIG. 6.
Figure 8:
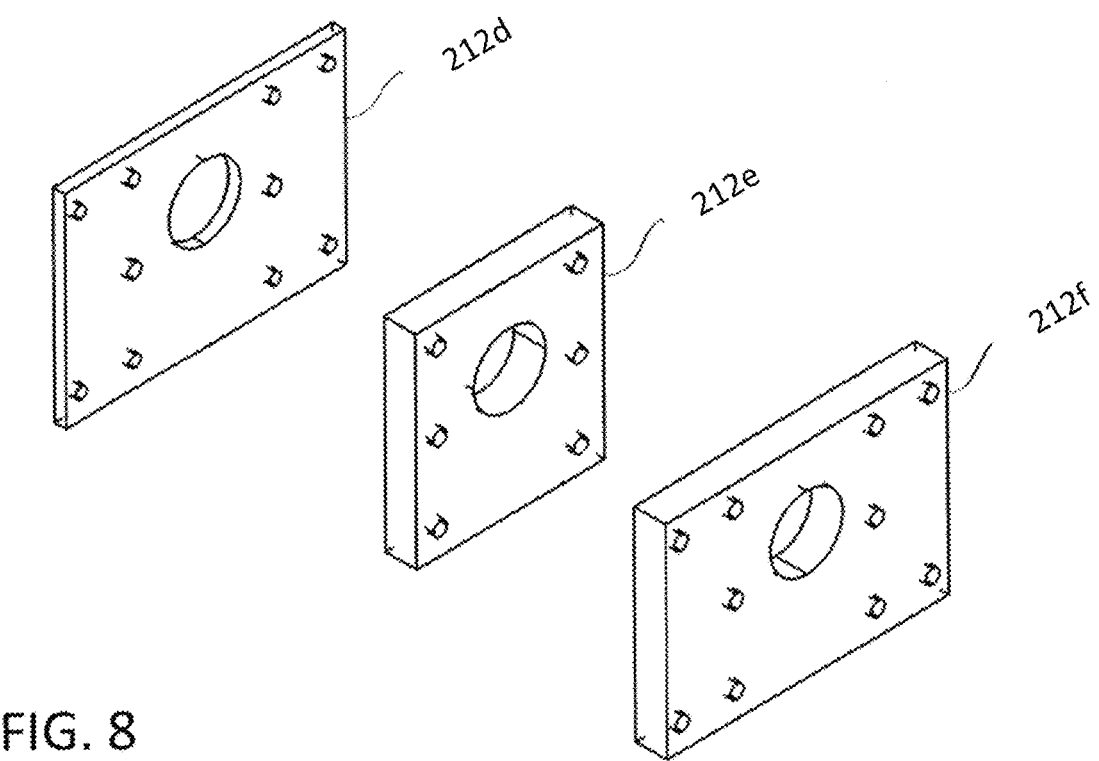
FIG. 8 is an enlarged view of a portion of some of the components illustrated in FIG. 7.
Figure 9:
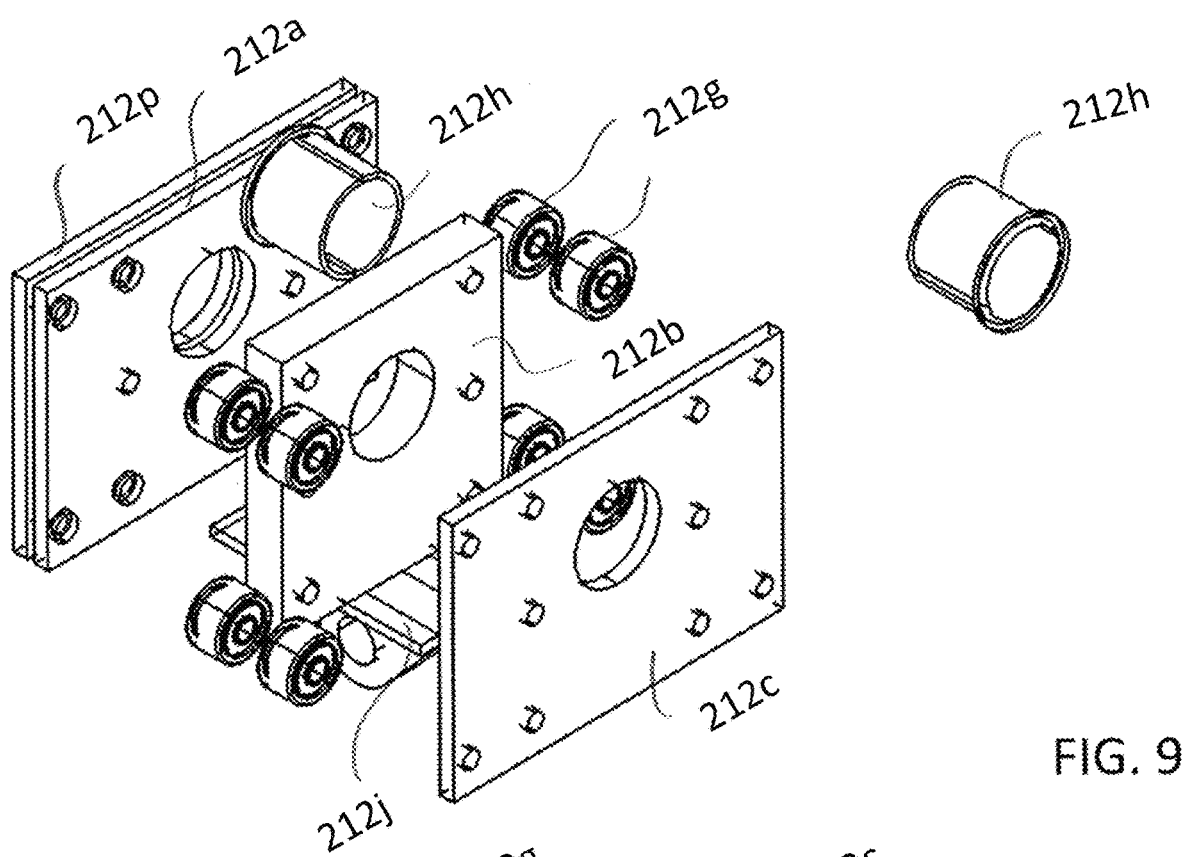
FIG. 9 is an enlarged view of other components illustrated in FIG. 7.
Figure 10:
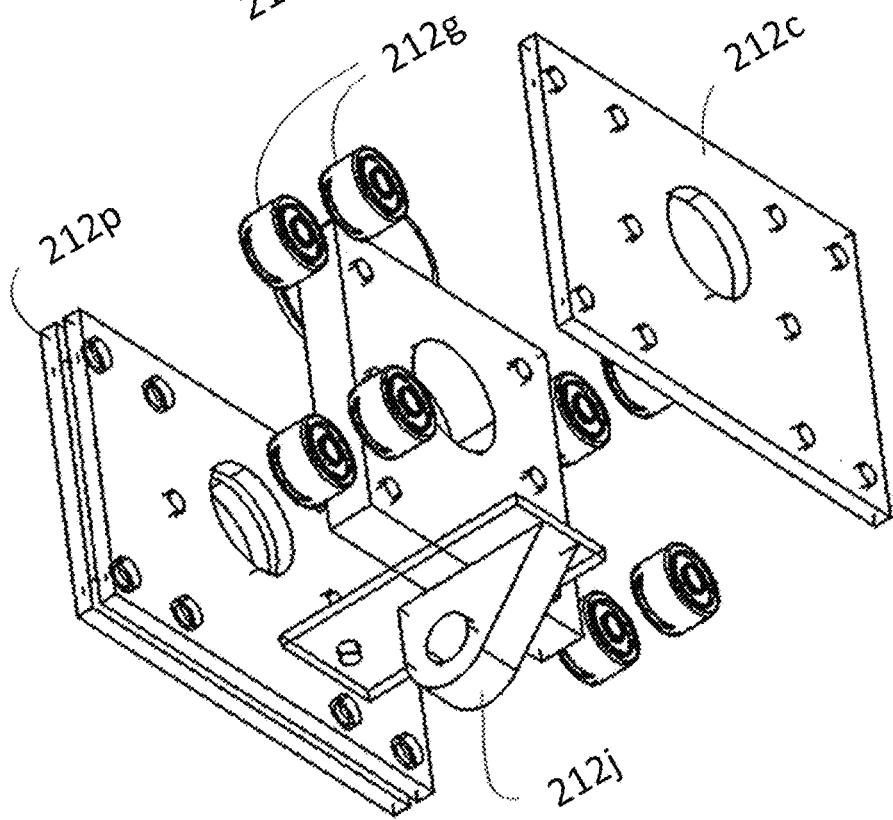
FIG. 10 is a lower isometric view of the components depicted in FIG. 9.
Figure 11:
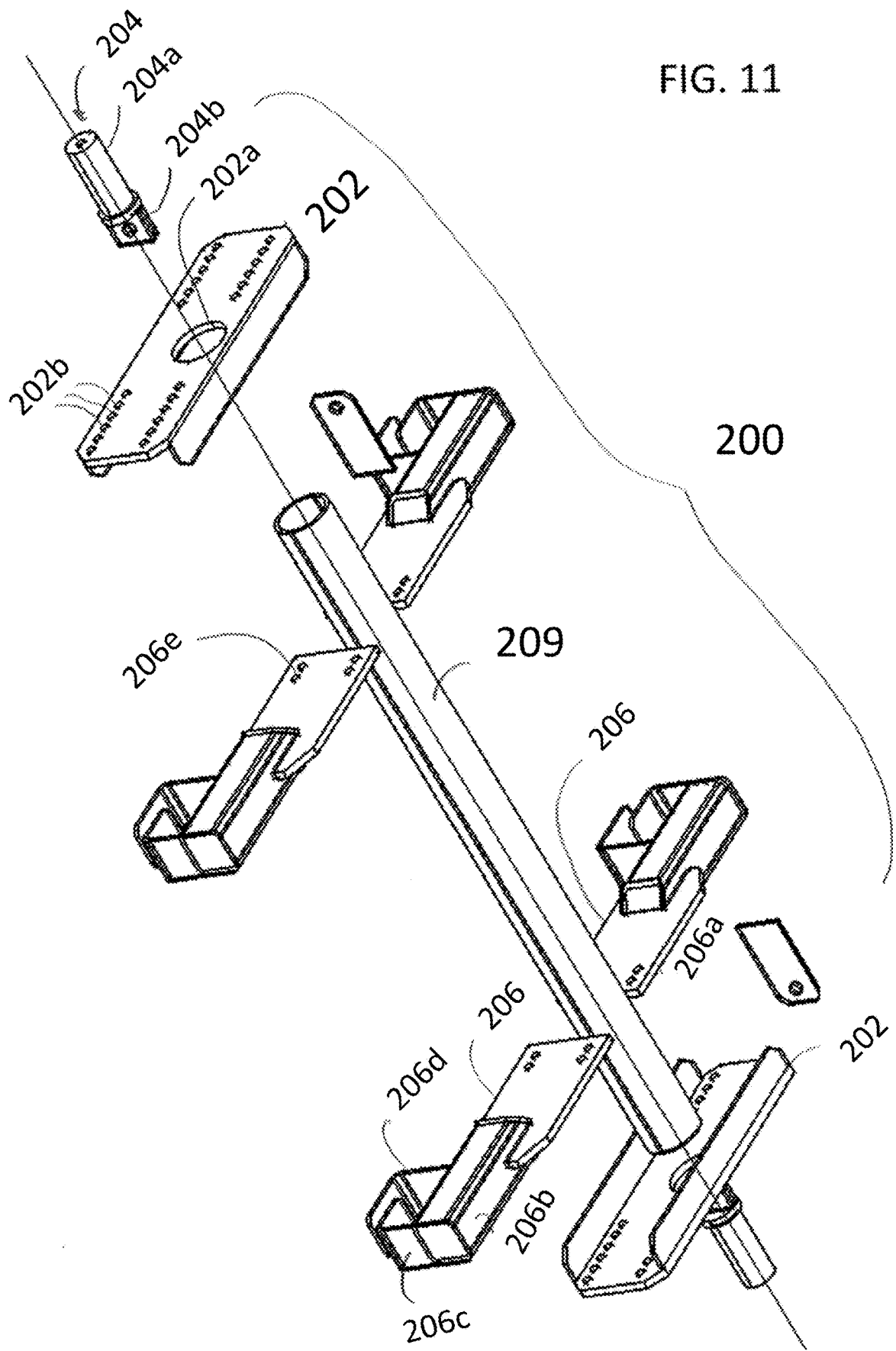
FIG. 11 is an exploded bottom isometric view of a yoke assembly of the bulk container discharge apparatus of FIG. 1.
Figure 12:
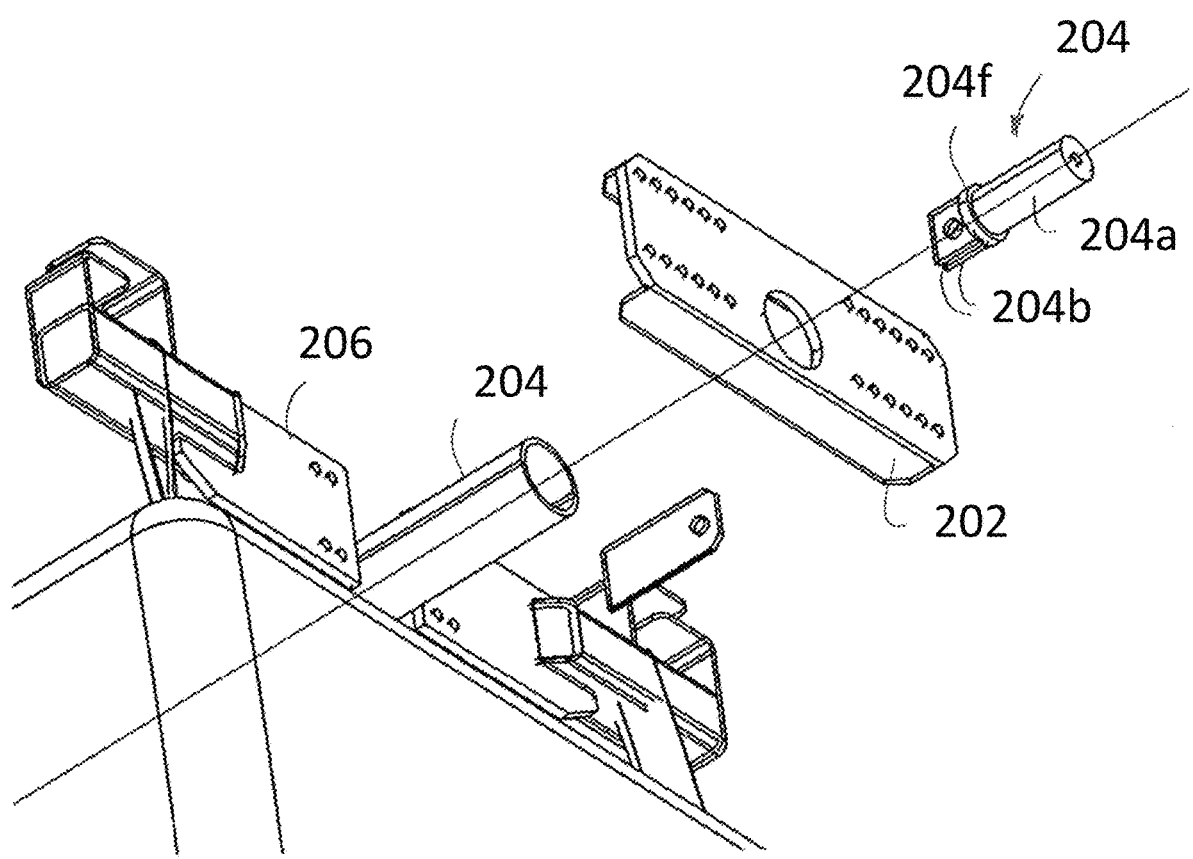
FIG. 12 is an enlarged view of a portion of the exploded view of FIG. 11.

With continuing reference to FIGS. 4, 5, 11 and 12, the yoke 200 is constructed around a central tube, or pipe, 209 that in turn is connected to the bearing blocks 212. Specifically, the tube has hollow ends that are welded or otherwise attached to plates 203 that extend out of the ends of the tube 209. Each plate 203 has a bore defined therethrough to facilitate bolting to a respective yoke 204b of a stub axle 204. The stub axle 204 has a cylindrical portion 204a that extends into the bearing journals 212h (FIG. 7) of the bearing block. With reference to FIG. 11, the central tube 209 is attached (e.g., by welding) to "C" channels 202. Each C-channel includes a bore through a central region thereof for receiving the tube 209 and a plurality of holes 202b that can be aligned with respective holes in arms 206. Each respective arm includes an inner plate portion 206a defining openings 206e therethrough for selective alignment with holes 202b of "C" channels. This design permits flexibility in setting the overall front to back length of the yoke assembly 200 for accommodating different sized bulk containers. Plate portions 206a are attached at an outer end to an extremity portion, illustrated here as a box tubing portion 206b. The outer free end of the box tubing portion includes two retainer bosses formed as overlapping hooks. Specifically, a first inner hook 206d protrudes upwardly from an upper surface of the box tubing portion 206b along a first portion, and then turns outwardly toward the free end of the box tubing portion along a second portion to form an "L" shape. A second outer hook 206d extends upwardly from the free end along a first portion, and has a second portion that extends (e.g., at about a 90 degree angle) away from the free end, and overlaps the second portion of hook 206d. This configuration permits an operator to guide the loop strap, for example, of a bulk container 206 between the second portions of hooks 206c, 206d and downwardly toward the upper surface of the box tubing portion 206b. The overall yoke assembly 200 pivotally rests in the bearing journals 212h of the bearing blocks 212 on the cylindrical portions 204a of axle stubs 204.

FIGS. 6-10 show various views of the bearing blocks, or cassettes, 212. Each bearing block or cassette 212 is formed form a sandwich of components including a plurality of plate portions 212a-212f, 212p, that each have a common aligned bore defined therethrough for receiving halves of bearing journal 212h. Plates 212b, 212e have a shorter front to back dimension in order to provide clearance for idler wheels 212g. Bearing blocks 212 are held together by bolts directed through holes aligned through the plates and the idler wheels 212g. A horizontal bracket 212j with an eyelet for receiving an upper end of the linear actuator 214 is welded to a bottom surface of plate 212b.

Figure 13:
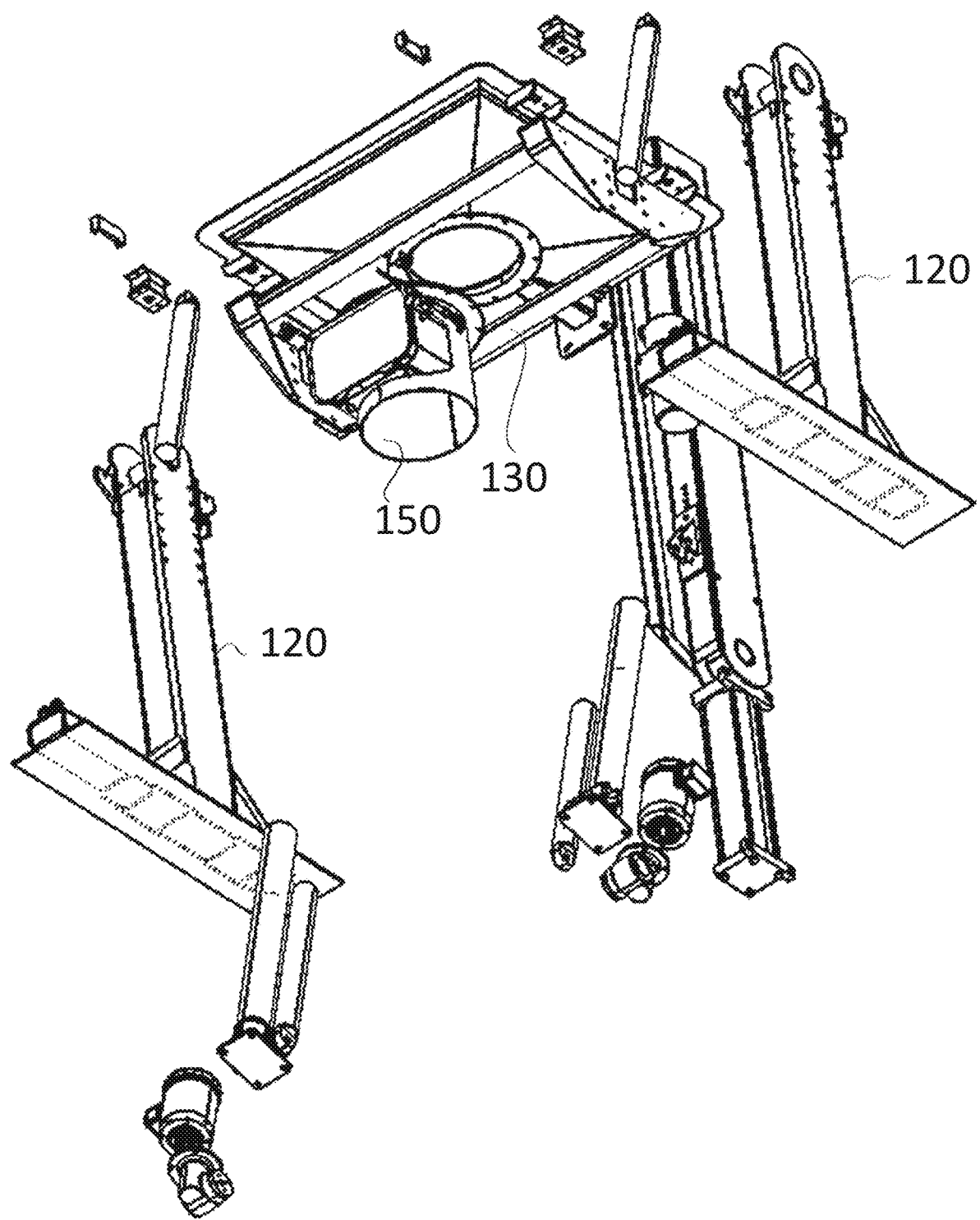
FIG. 13 is a bottom isometric exploded view of a lower portion of the bulk container discharge apparatus of FIG. 1.
Figure 14:
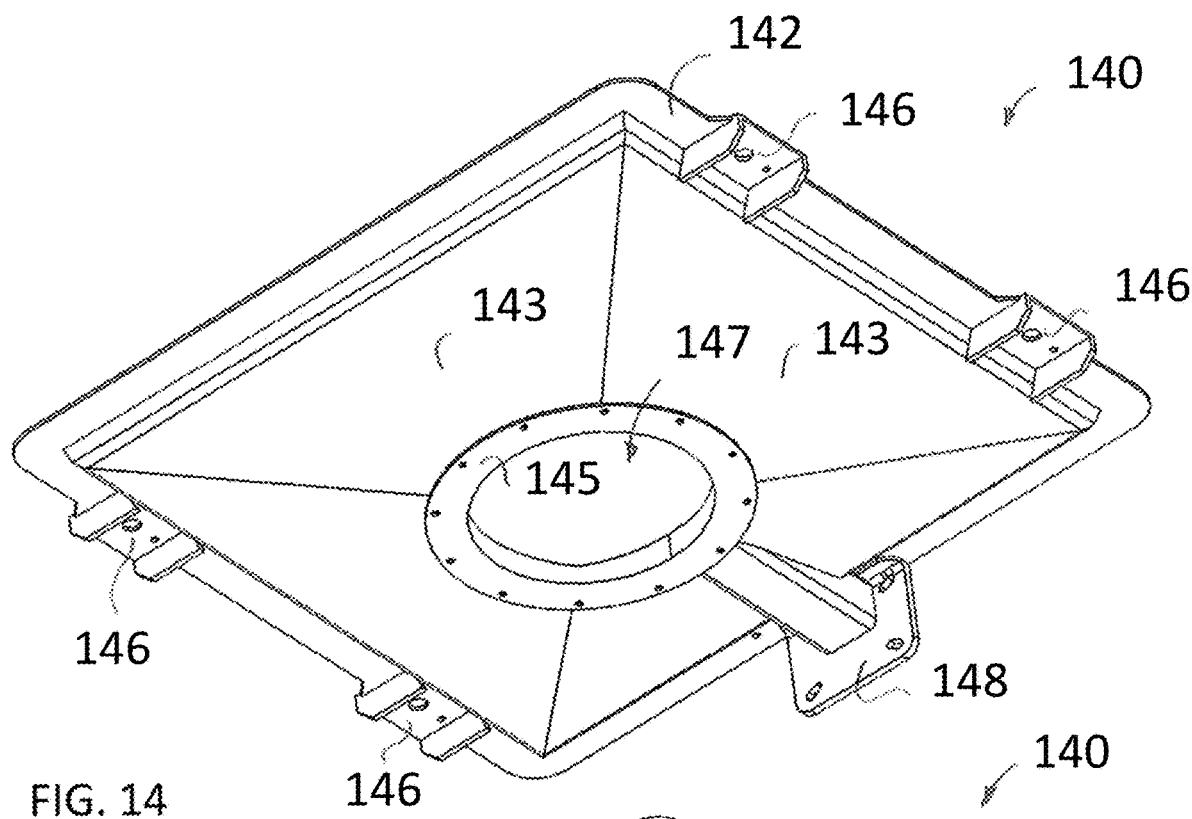
FIG. 14 is a bottom front isometric view of a platform, such as a bag pan, used in the bulk container discharge apparatus of FIG. 1.
Figure 15:
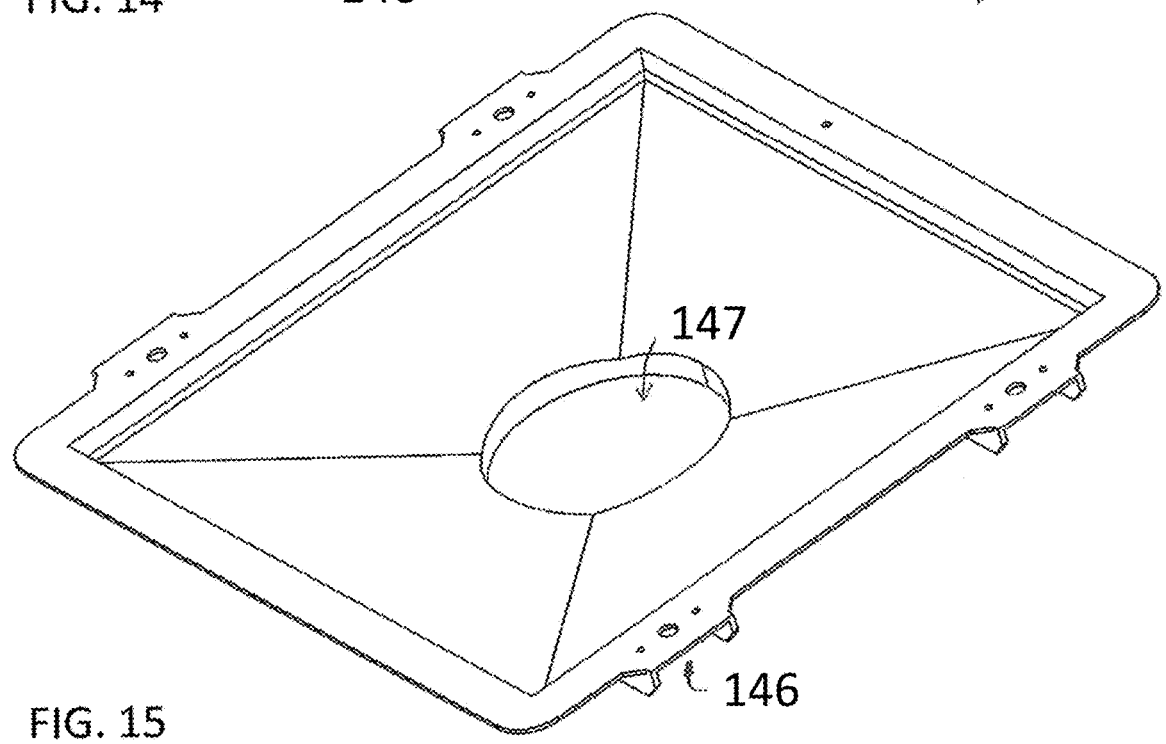
FIG. 15 is a top front isometric view of the bag pan of FIG. 14.
Figure 23:
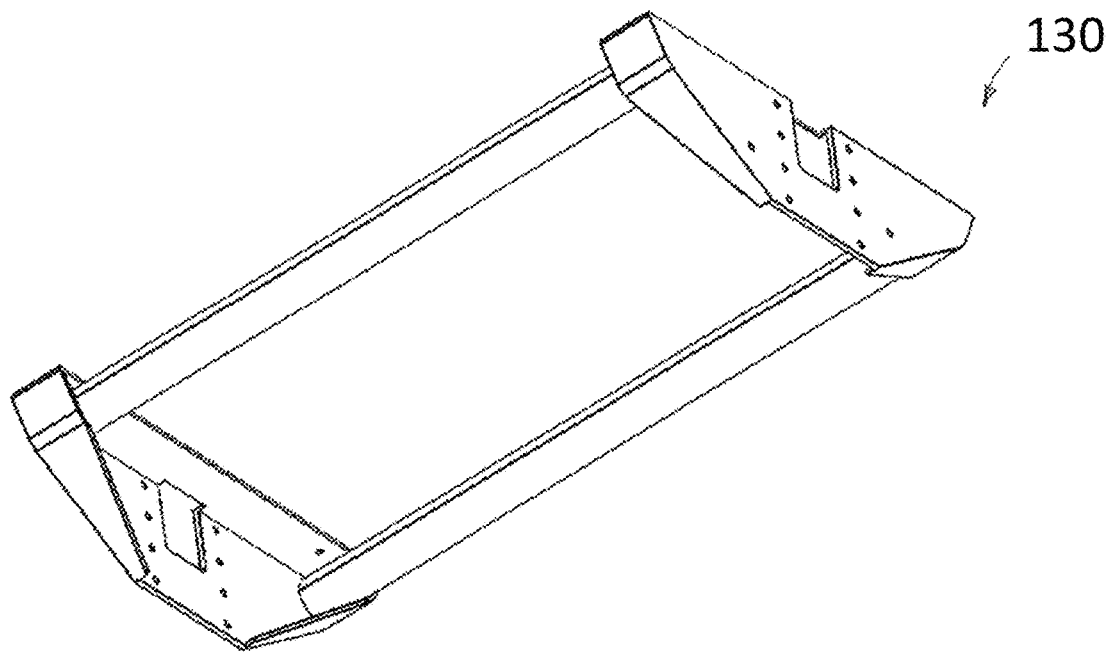
FIG. 23 is a bottom front isometric view of a lateral horizontal support of a base portion of the bulk container discharge apparatus of FIG. 1.
Figure 24:
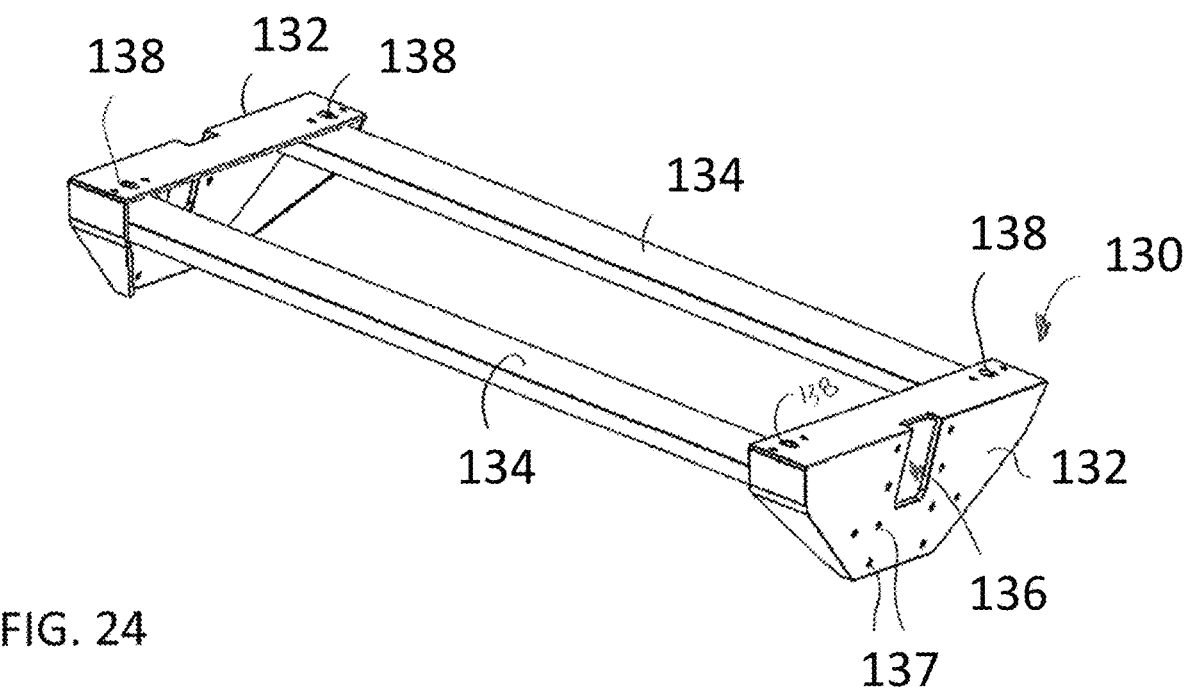
FIG. 24 is a top front isometric view of the lateral horizontal support of FIG. 23.
Figure 26:
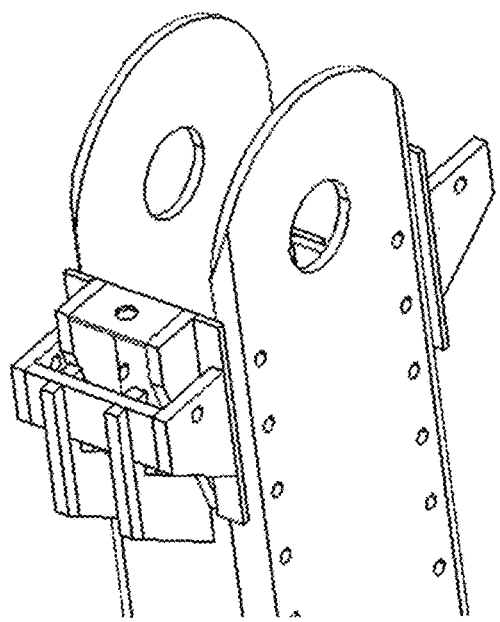
FIG. 26 is a top rear isometric view of an upper portion of the leg of FIG. 25.
Figure 25:
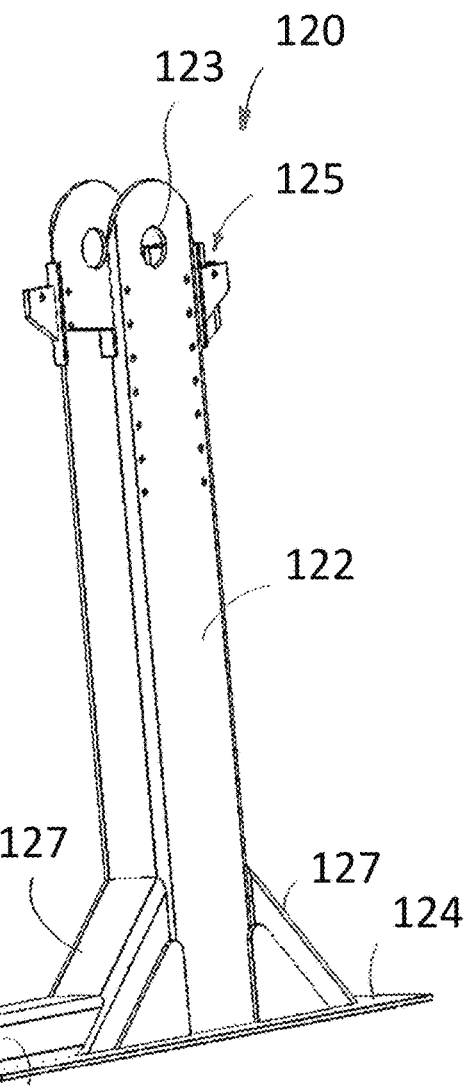
FIG. 25 is a front isometric view of a leg of a base portion of the bulk container discharge apparatus of FIG. 1.
Figure 27:
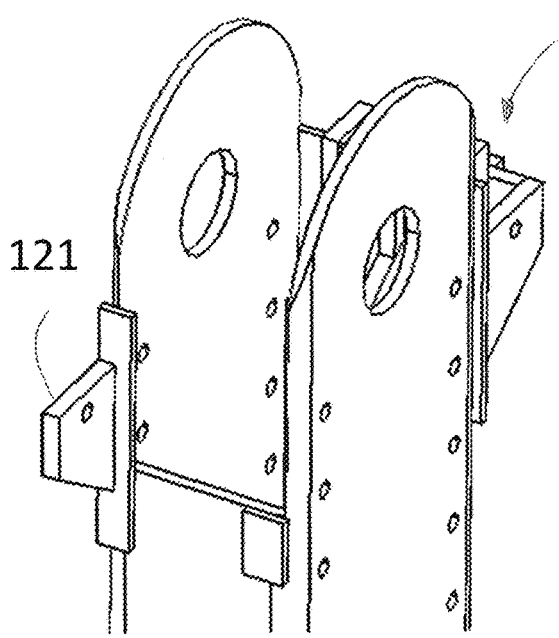
FIG. 27 is a top front isometric view of an upper portion of the leg of FIG. 25.

FIG. 13 illustrates an exploded view of the base portion 110 of the device 100, showing legs 120, and lower frame 130. FIGS. 14-16 illustrate various views of the bag pan or platform 140 which couples to the lower frame 130 by way of (e.g., four) vibration isolators. FIG. 14 is a bottom front perspective view of the bag pan, FIG. 15 is a top front perspective view of the bag pan, and FIG. 16 is a top rear perspective view of the bag pan. As illustrated, the bag pan is generally rectangular in transverse shape, but can be any desired shape. The bag pan includes an outer peripheral flange 142 that traverses the perimeter of the bag pan, coupled directly or indirectly to one or a plurality (e.g., 4) of adjoining panels that cooperate to form a depression, or declined surface that approaches a central opening or orifice 147 through which the exit spout of a bulk container 600 can empty its contents. An inner flange 145 is attached to a bottom face of the bag pan 140 and includes a plurality of bolt holes for receiving a glove box 150, discussed below. Also attached to the lower face and the back of the bag pan and the flange 142 is a vertically oriented flange 148 that includes a plurality of openings to permit an industrial vibrator 160 (FIG. 18) to be bolted thereto. The flange 142 also includes four mounting flanges 146, each of which is shaped to receive an upper surface of a vibration isolator 170 (FIG. 17). The vibration isolator is defined by an upper plate 172 and lower plate 172 that are each bolted to the lower surface of the flange 146, and to an upper surface of the lower frame 130 by way of respectively aligned bolt holes. The plates 172 of the vibration isolator are attached to each other and separated by a material that can absorb and/or deflect vibration (e.g., rubber or other polymer and/or a compression coil spring). In use, the downwardly sloped upper facing surface of the bag pan helps guide material downwardly and radially inwardly to help it exit from the bulk container 600. The vibrator 160 induces vibration in the bag pan 140 through flange 148. The mechanical energy of the vibrator is then transmitted via direct contact to the contents of the bulk container 600 to help loosen and transport the contents.

FIG. 19 is a bottom front isometric view of a glove box portion 150 of the bulk container discharge apparatus 100, and FIG. 20 is a top rear isometric view of a glove box portion of the bulk container discharge apparatus of FIG. 19. FIG. 21 is a front bottom isometric view of a removable cover for the glove box of FIG. 20. FIG. 22 is a rear isometric view of a removable cover for the glove box of FIG. 20. As illustrated, the glove box 150 includes a (e.g., cylindrical) body formed by a peripheral wall 154 that can be vertically oriented, or funnel shaped, as desired. The wall 154 defines an opening or port 155 therethrough that is mated to an access flange 156. An upper peripheral flange 152 is attached to an upper edge of the peripheral wall for attachment to flange 145 of the bag pan 140. The port 155 preferably has a removable door 158 that can be hingedly attached to the flange 156 by way of hinge brackets 157. In use, the door is opened after a bulk container 600 is deposited in the bag pan 140. A user extends their hand into the glove box and unties the bottom opening of the container 600, permitting product to exit the container 600 and through the chute defined by wall 154 of the glove box 150.

FIGS. 23-24 and 25-27 illustrate components of the base portion 110 of the device 100. Lower frame 130 includes two opposing flanged ends 132, wherein each flanged end includes openings for permitting bolting to the openings defined in the upper portions of the legs 120, including inboard flange 121 and rear flange 125. Openings 136 are provided to permit clearance for the hinge pivot pin that is disposed through opening 123 of each leg 120. Lower frame 130 as illustrated also includes mounting holes 138 to permit coupling of lower frame 130 to vibration isolators 170, and then to bag pan 140. Flanges 132 are separated by and connected by way of lateral rails 134. Each leg 120 includes an upright portion 122 that is illustrated as being formed by box tubing, although it will be recognized that other configurations fall within the scope of the disclosure. The upright portion 122 defines a plurality of openings 123 therein for a pivot pin to facilitate connection to a lower end of arm 180. Leg 120 includes base portion 124 for resting on a floor or platform and diagonal braces 127 for stability, as well as box tube section 128 that includes a bolt flange 129 for pivotally receiving a lower end of the articulation drive 190.

Figure 28:
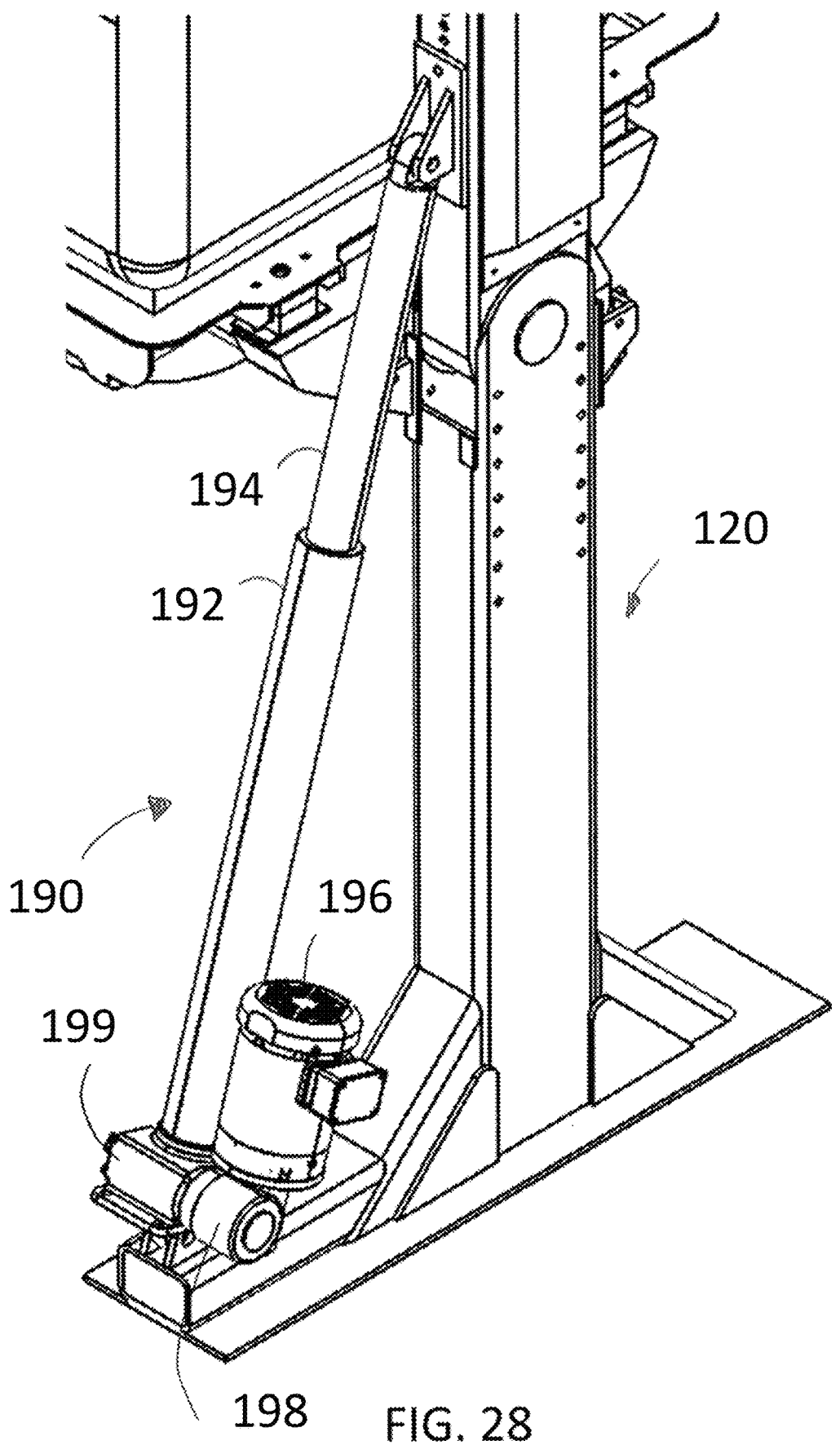
FIG. 28 is a front isometric view of a portion of an articulation drive system of the bulk container discharge apparatus of FIG. 1.
Figure 29:
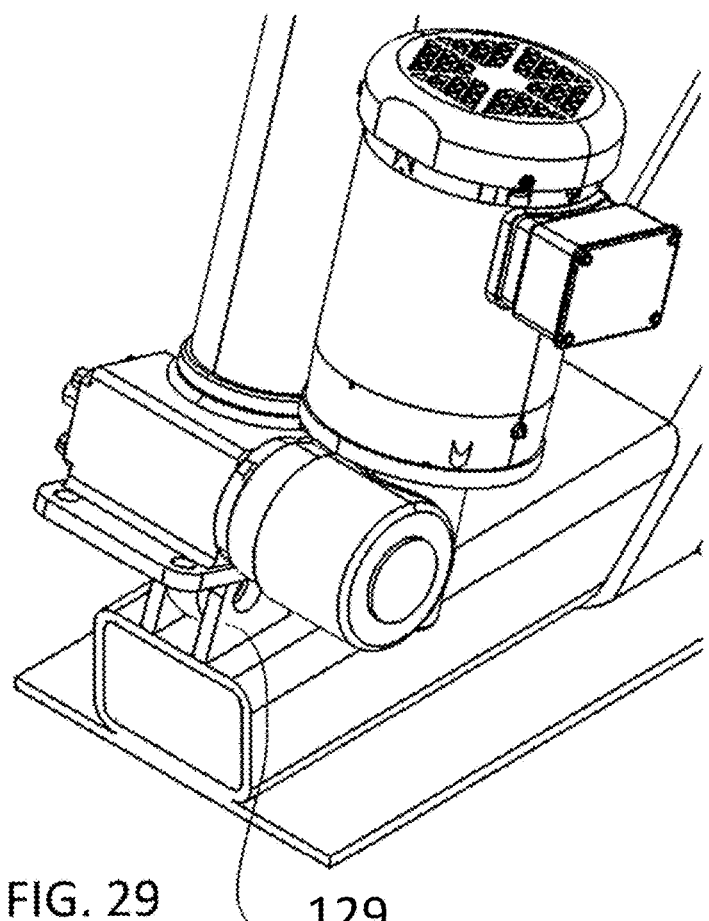
FIG. 29 is a close up front isometric view of a motor and gearbox portion of the articulation drive system depicted in FIG. 28.
Figure 30:
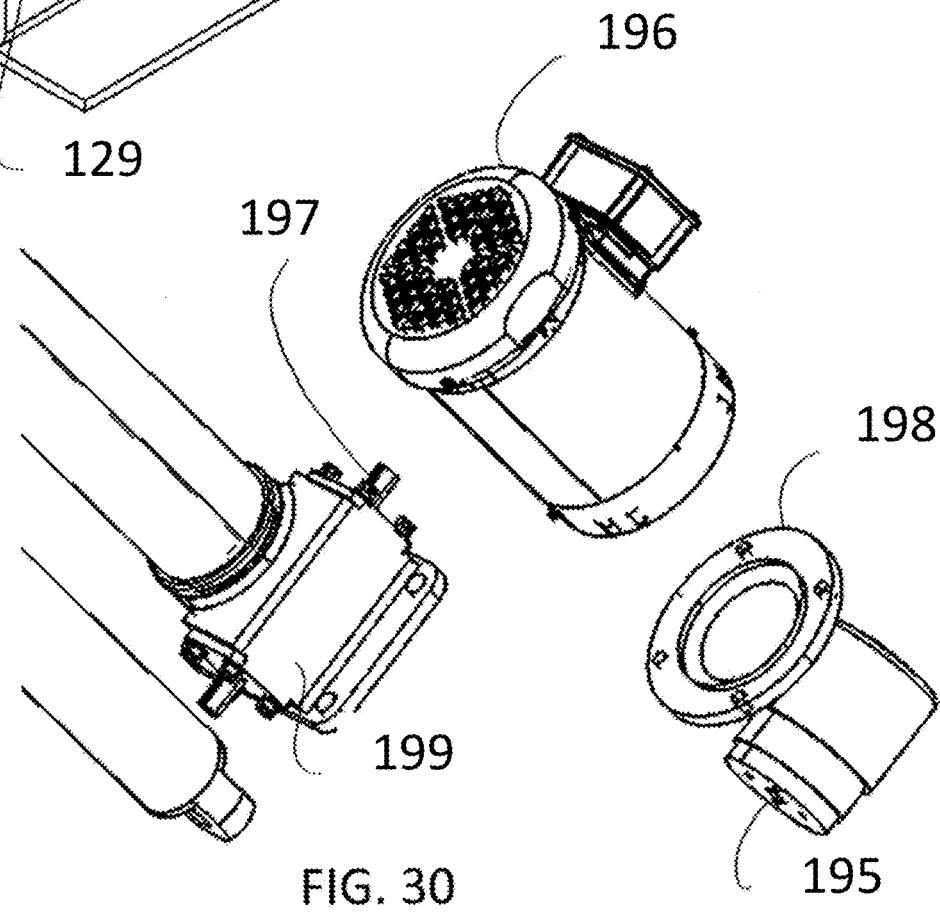
FIG. 30 is an exploded view of the components of FIG. 29.
Figure 31:
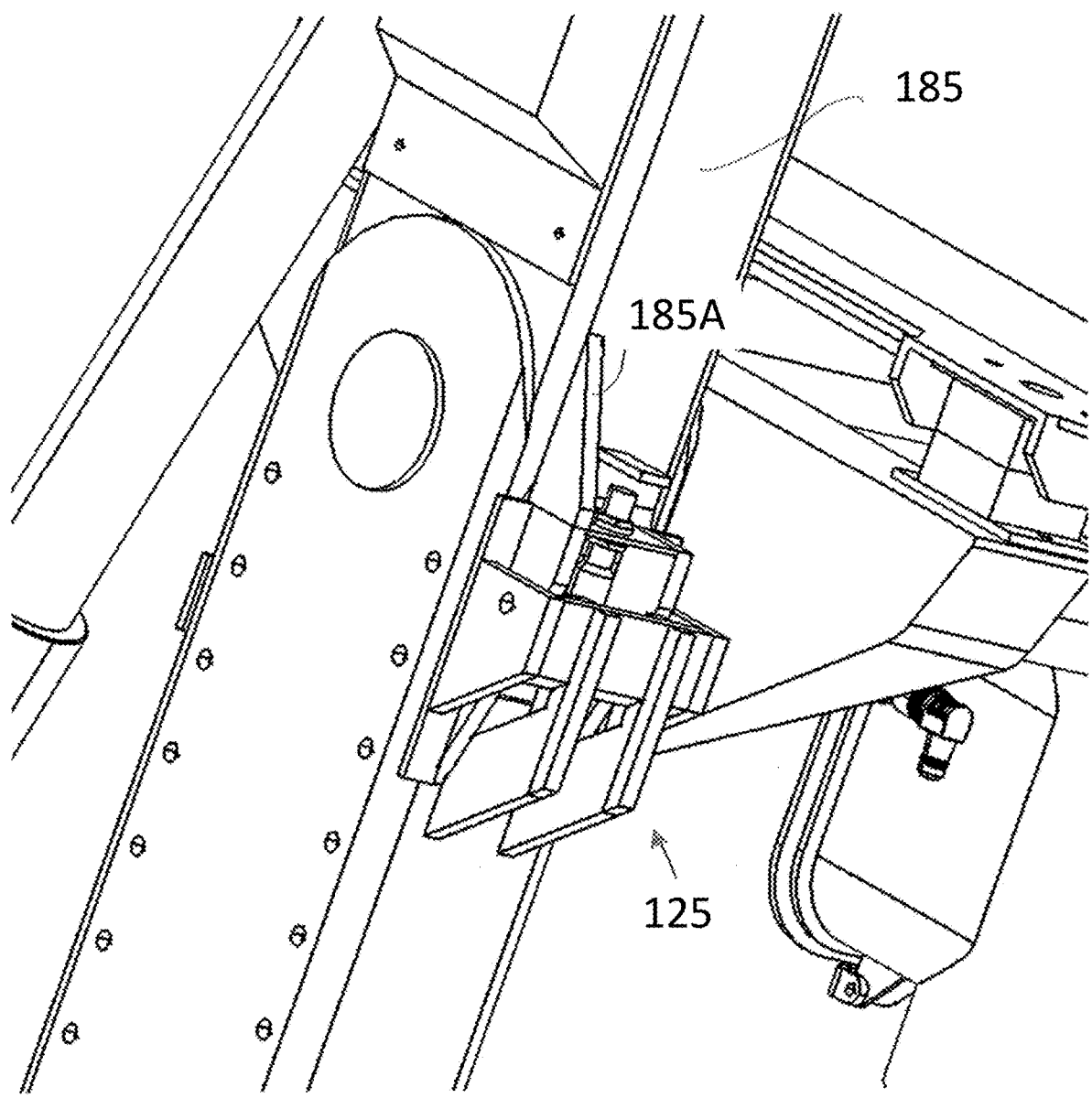
FIG. 31 is a isometric rear view of an articulation joint of the bulk container discharge apparatus of FIG. 1.

FIGS. 28-30 illustrate portions of the articulation drive 190 that is used to swing arm 180 about pivot 184 (FIG. 1). Drive 190 includes a longitudinally extending drive that includes a stationary tubular portion 192 that is attached at a lower end to gearbox 199, adaptor 198, and electric motor 196. Motors 196 are coupled to a control system, described in detail below. The motor generates torque through an output shaft when actuated, which enters a 90 degree drive adaptor 198, which by way of coupling 195, received spindle 197 of the stationary tubular portion. Drive shaft 197 can be coupled to an internal worm gear (not shown) that in turn meshes with a gear surrounding an internal drive screw or power screw situated within housing 192. The drive screw/power screw is directly or indirectly attached or coupled to upper portion 194 that is coupled by way of a shackle to front face 185a of arm 180. Thus, when the motor 196 is turned on, the power screw in the housing 192 rotates, lengthening or shortening the distance between the upper and lower pivoted connections of the drive 190. If desired, a detector (magnetic or optical or electrical, for example) is provided within each drive 190 for counting the number of revolutions of each drive unit. The signal generated by the detector can then be routed to the controller, and the controller can ensure that the drive units are lifting each side of the device by the same amount to help keep the load of the bulk container 600 balanced. FIG. 31 depicts a stop flange 125, an upper surface of which abuts flange 185A attached to the rear surface 185c of the arm 180. When the arms 180 are fully raised, the flanges collide, preventing further movement past vertical. Electric power screw actuators as illustrated are advantageous because if electrical power is lost, the screws will not actuate under the force of the weight of the bulk container and mechanism, making it considerably safer potentially than hydraulic actuators. The hydraulic or pneumatic actuators 214 can similarly be replaced with electrical power screw actuators, but given the small amount of lengthwise travel, and since their failure would merely result in the bag or container 600 landing on the bag pan 140, this does not result in a similar safety issue.

Figure 38:
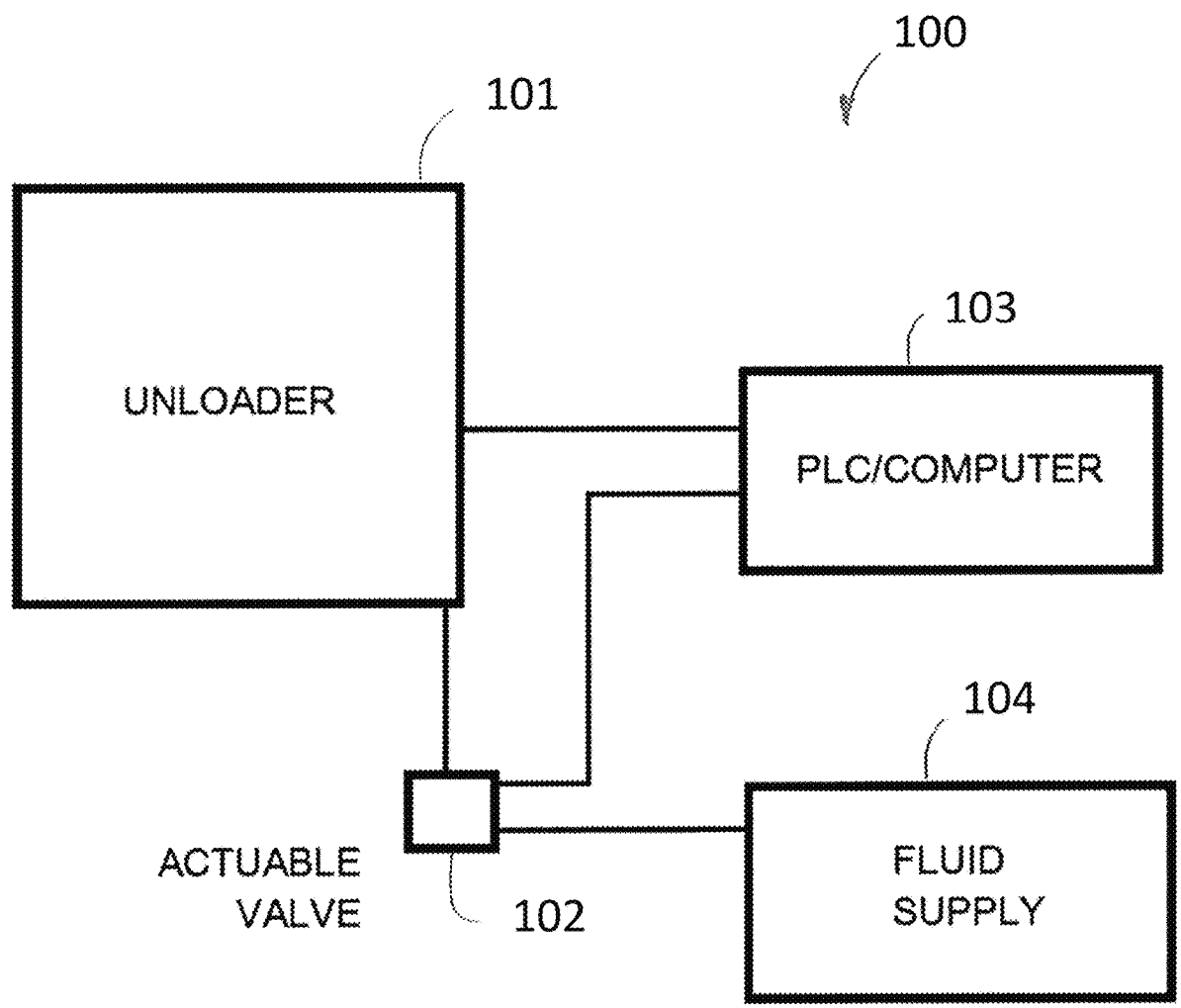
FIG. 38 is a schematic view of a system in accordance with the present disclosure.

As illustrated in FIG. 38, the bulk container discharge apparatus 100 can further include one or more processors 103, such as a computer and/or programmable logic controller ("PLC") operably coupled to various components, such as the articulation drive 190 and/or the linear drive pistons 214, as well as sensors 107 and rotational sensor(s) in each articulation drive 190. When a plurality of articulation drives and/or linear drives are provided, the processor or PLC 103 can be configured to synchronize the movement of each of the linear drives and/or articulation drives to maintain the bulk container 600 in a level condition, or to purposely orient the bulk container in an orientation that is not level, such as to help empty the container while it is discharging. Control of actuators 214, if pneumatic or hydraulic, can be facilitated by interposing one or more actuatable valves 102 (e.g., a valve manifold), controlled by the PLC, along the fluid path between a pressurized fluid supply 104 (e.g., pump, compressor and/or reservoir) and the drive pistons 214 of the system 100. The PLC/controller 103 can then detect the relative height of each side of yoke 200 by way of sensors 107, and control the opening of each valve feeding each linear actuator 214 to ensure that the yoke is maintained in a level condition while the bulk container 600 is being raised. The processor or PLC 103 can be further configured to deliberately orient the yoke in a non-level orientation, or to move the yoke up and down when emptying the bulk container to cause material to flow toward the middle of the container and out through the glove box 150. The system is preferably operated in order to maintain tension on at least one sidewall of the bulk container.

Various methods of emptying bulk containers are provided. An illustrative, non-limiting method can include providing a bulk container discharge apparatus as described herein, for example, then coupling a bulk container to the yoke of the discharge apparatus. The method further includes lifting the bulk container along the articulation path, lowering the bulk container onto the platform, and opening the bulk container in order to empty it.

Figure 35:
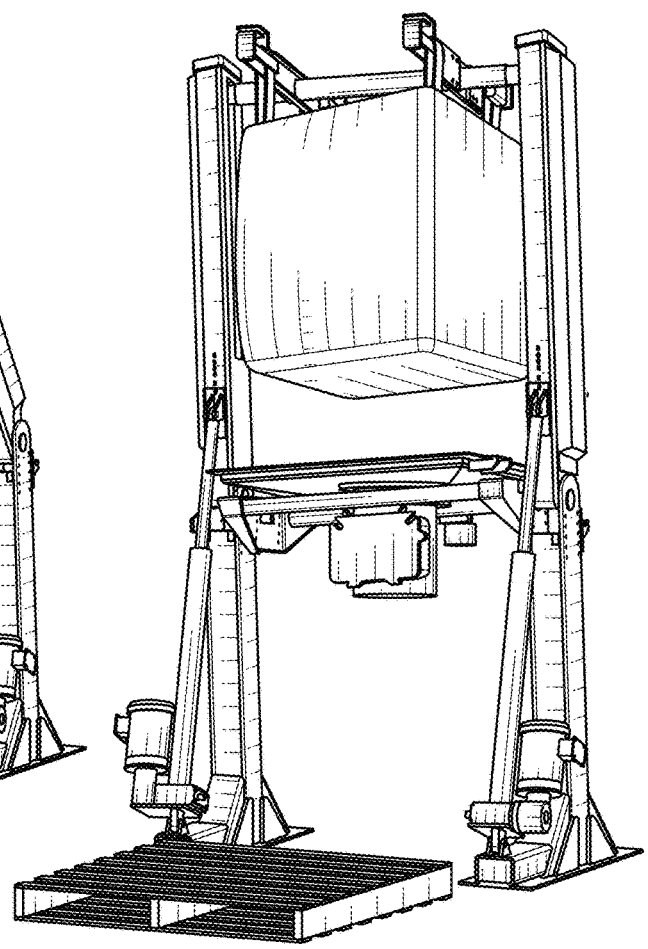
Figure 36:
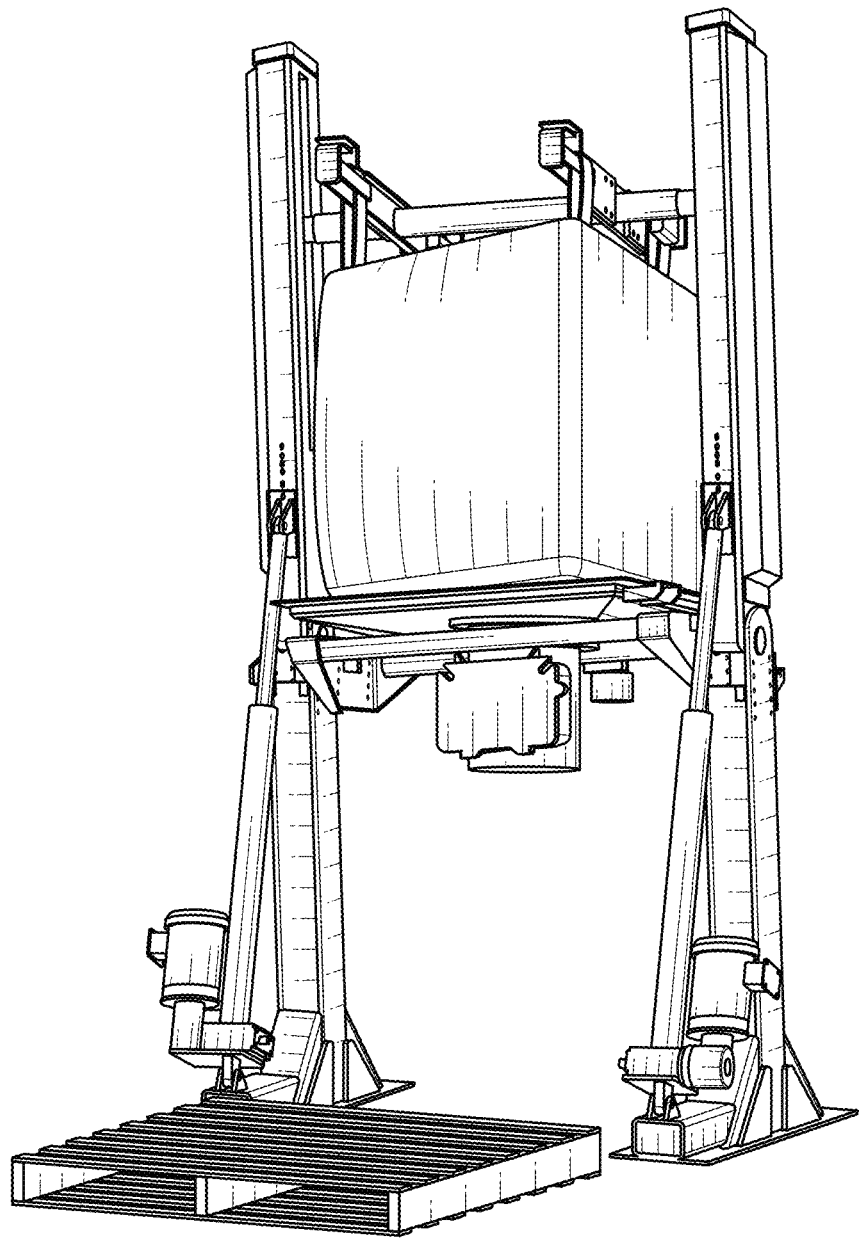

For purposes of illustration and not limitation, FIGS. 32-36 illustrate lifting of a bulk container, such as a bag, off of a pallet or skid (FIG. 32), and up and over the bag pan 140 of the device (FIG. 35). The linear actuators then act to lower the bag onto the bag pan (FIG. 36). The bag can then be untied underneath via the glove box 150, and the contents of the container 600 can then drain through the center of the bag pan 140 and out through glove box or spout 150.

In some embodiments, the method can include lifting at least a portion of the bulk container is it is being emptied in order to maintain tension on at least one sidewall of the bulk container. The method can optionally include moving at least a portion of the bulk container upward and downward, along orientations where the container is level and/or not level in order to facilitate emptying the container.

Figure 37A:
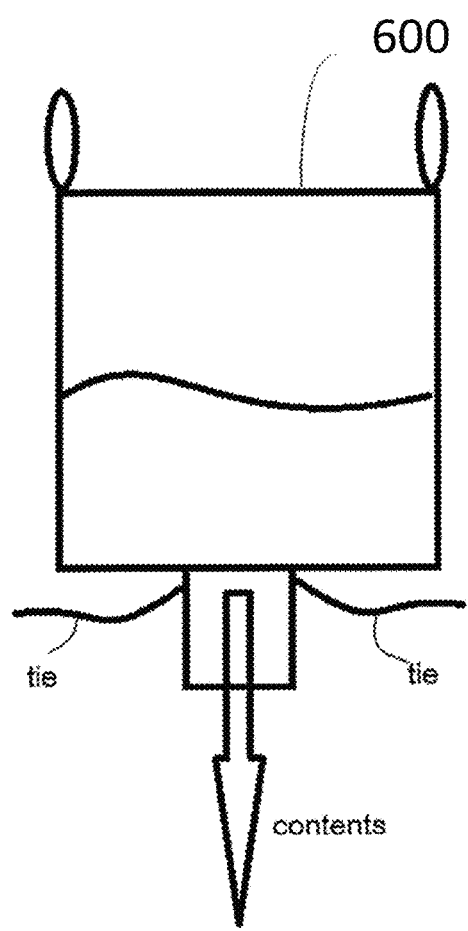
FIG. 37A is a first schematic view of an unloading process of a bulk container in accordance with the present disclosure at a beginning of the process.
Figure 37B:
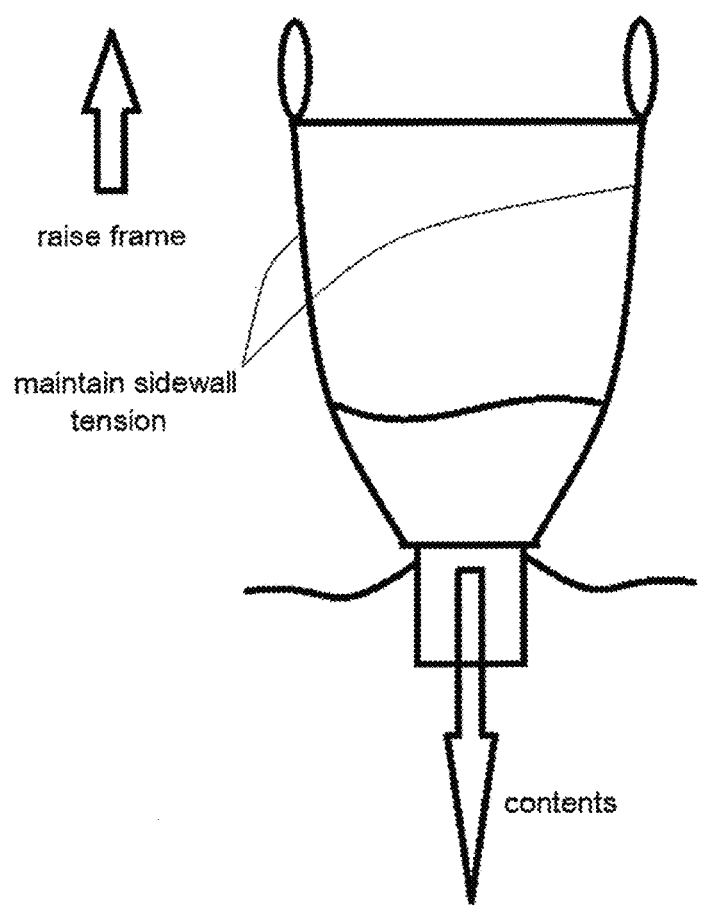
FIG. 37B is a schematic view of the process of FIG. 37A during a later stage of the process.

For purposes of illustration, and not limitation, as illustrated in FIG. 37A, a schematic cross section of a bulk container 600 is provided, illustrating that the ties of the bag have been detached, permitting product to flow out. As the bag empties, constant or intermittent upward vertical force can be imposed on the yoke 200 to maintain tension on the sidewall of the bulk container, particularly if the bulk container is flexible. This upward force stretches the container upward as illustrated in FIG. 37B. The upper loops of the bag gradually rise until the bag/container 600 has been emptied.

Figure 39:
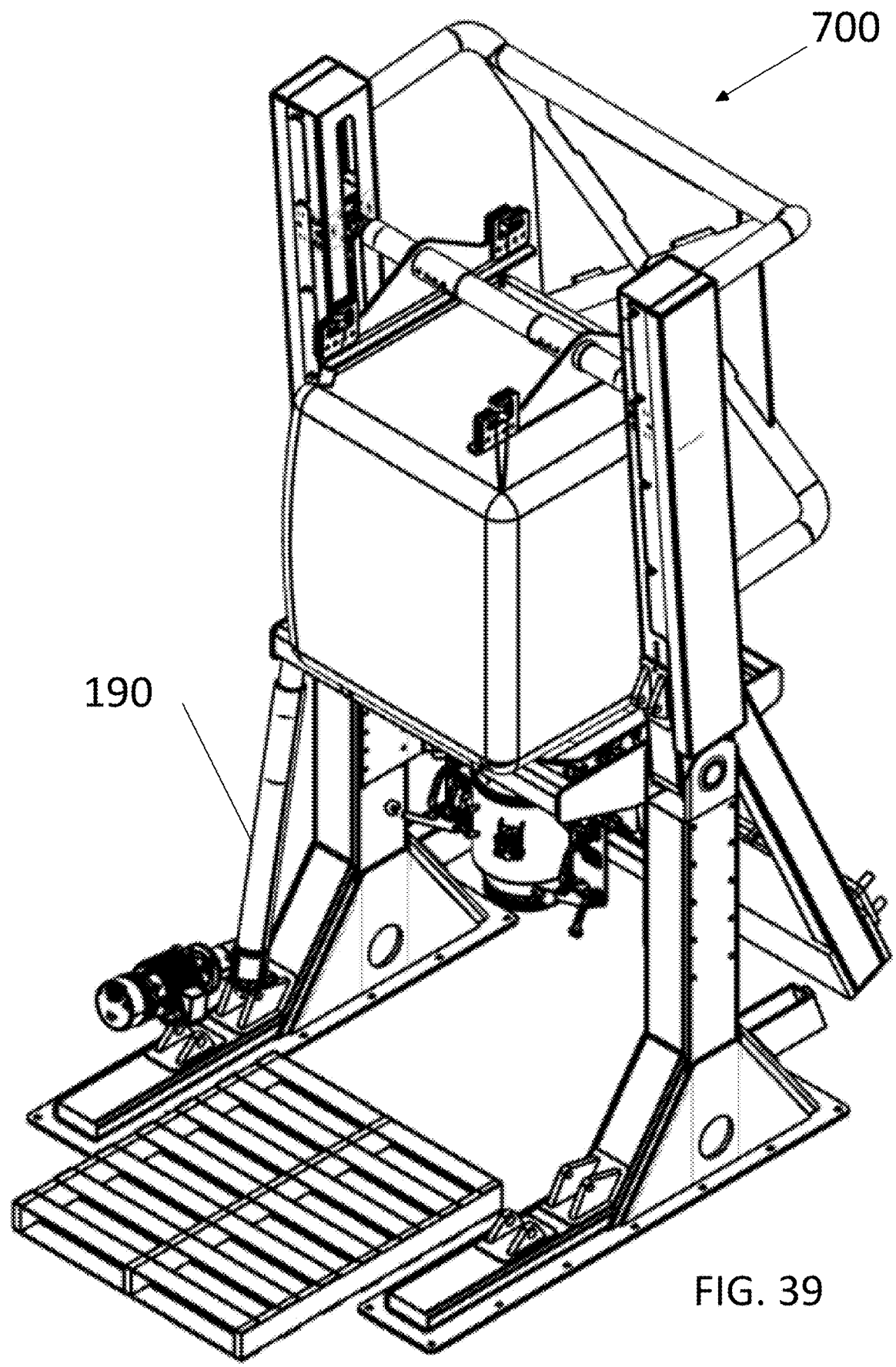
FIG. 39 is an isometric right front upper view of a second embodiment of a bulk container discharge apparatus in accordance with the present disclosure.
Figure 40:
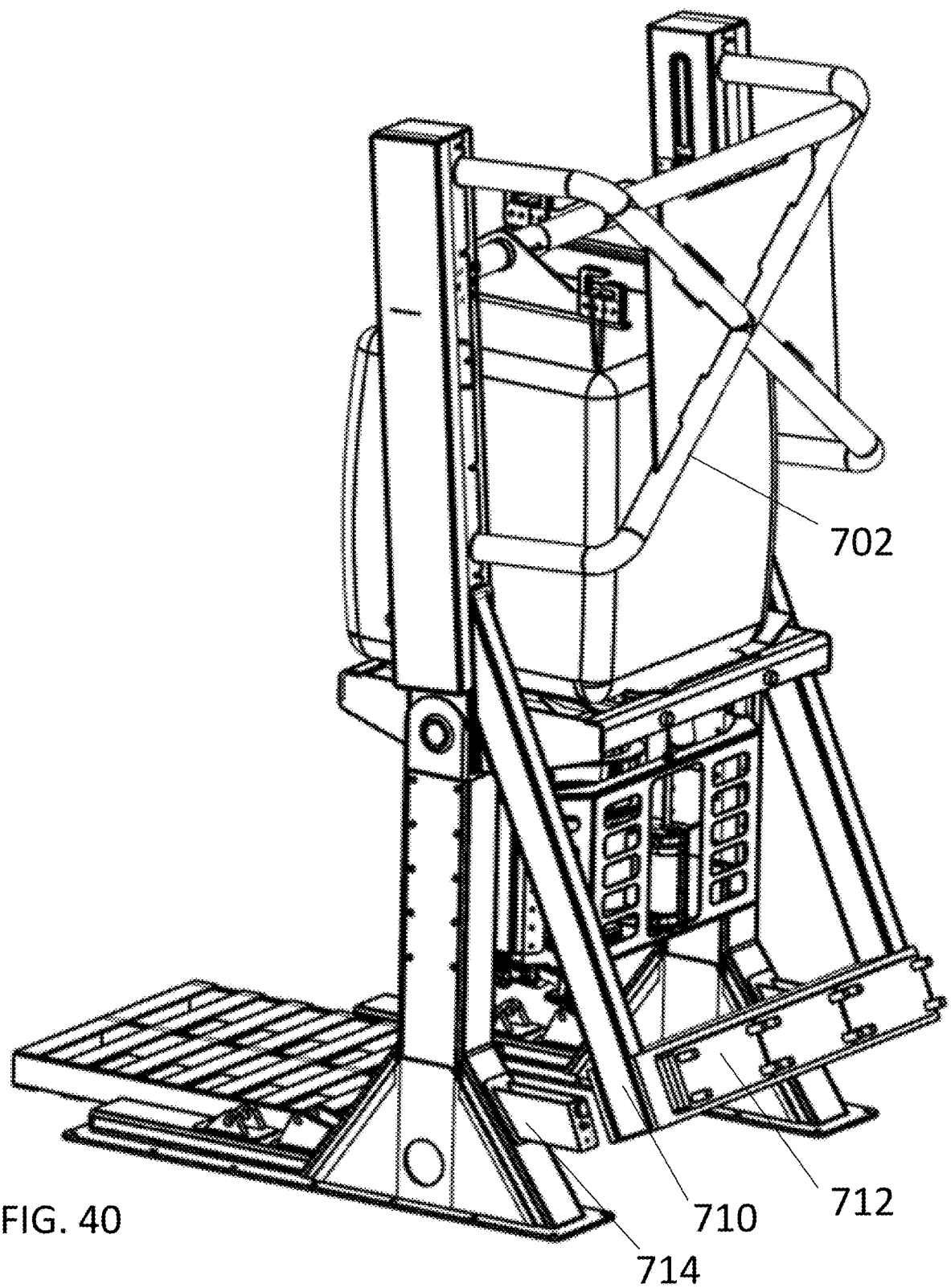
FIG. 40 is an isometric right rear upper view of the bulk container discharge apparatus of FIG. 39.
Figure 41:
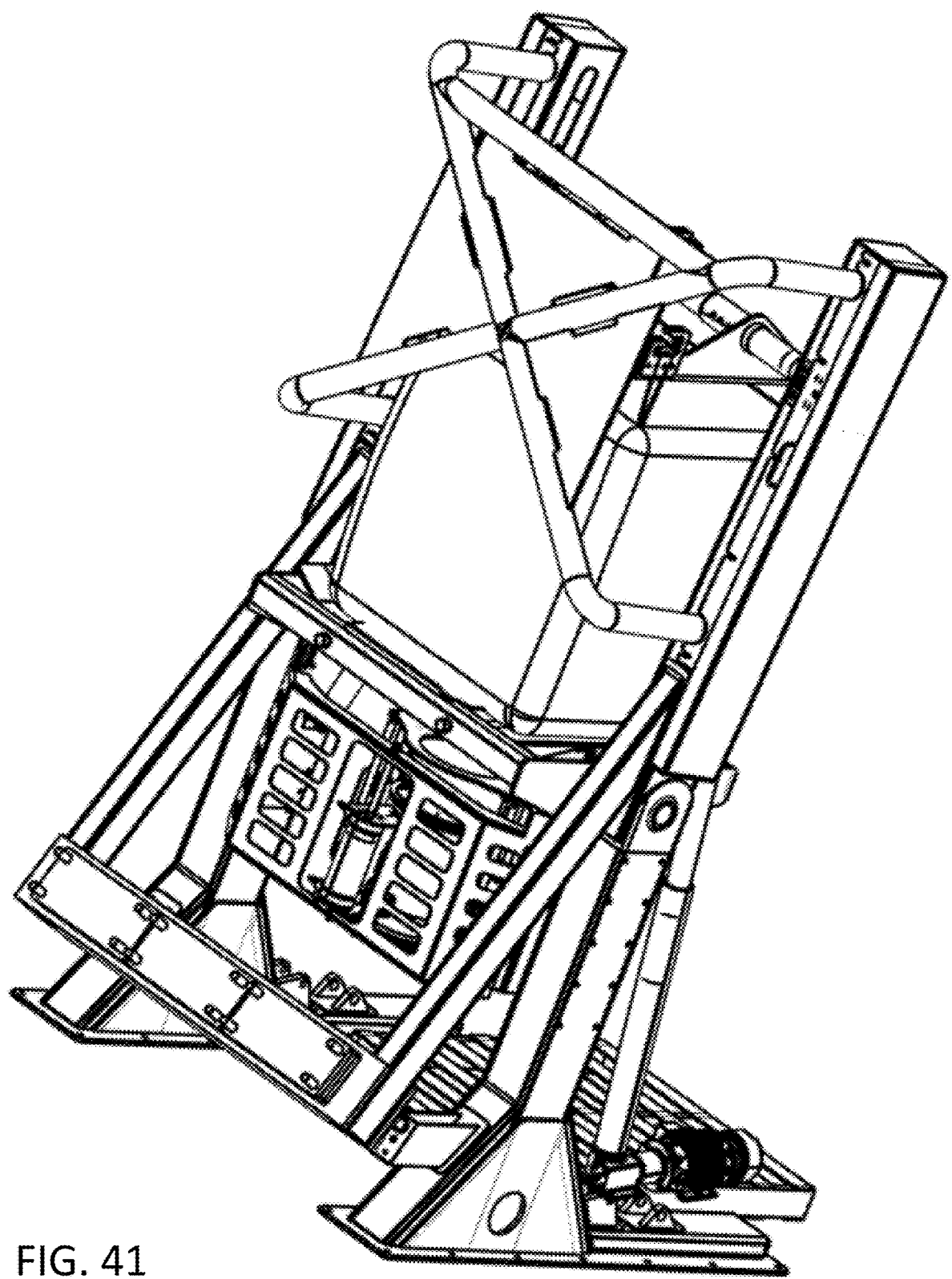
FIG. 41 is an isometric left rear upper view of the bulk container discharge apparatus of FIG. 39.

FIGS. 39-41 are various isometric upper views of a second illustrative embodiment of a bulk container discharge apparatus 700 in accordance with the present disclosure. This second embodiment is similar in many respects to the earlier embodiment. Thus, only the differences and additions with respect to that embodiment are discussed herein below in detail.

The features enabling motion and articulation of the device and structure as set forth in FIGS. 1-12 as described with respect to the prior embodiment are essentially the same in the second embodiment. However, the main difference in the second embodiment with respect to these figures is that only one articulation drive (e.g., 190) is present that is coupled to the base portion (e.g., 110) and to the at least one articulating arm, or "mast" (e.g., 180) on a single side of the device, rather than on both sides. As with the preceding embodiment, the articulation drive 190 is configured to articulate the at least one articulating arm about the first pivot. This can be done to simplify the device and/or reduce cost.

However, given that force is being applied to only one side of the structure, this second embodiment 700 includes certain structural enhancements to increase the rigidity of the device and potentially reduce the load that needs to be applied by the articulation drive. While these enhancements can also be used on embodiment 100, these enhancements are of particular utility with embodiment 700.

For example, with reference to FIG. 40, the articulating arms or masts are connected by a brace 702. As depicted, the brace 702 is defined by a framework that is attached to the rear facing surfaces of the articulating arms 180. The framework extends backwardly and then laterally across to connect the arms 180 rigidly together. Preferably, the framework is arranged to include one or more structural triangular sections. For example, the brace 702 includes an "X" shaped frame, wherein each corner of the "X" is connected to a backwardly extending section that attaches to the arms 180. As illustrated, one or more triangular plate sections (three in the figures) are attached (e.g., via welding) to the X frame, resulting in the arms 180 being an integral structural unit by way of brace 702.

To assist the single articulation drive 190 in articulating the arms 180 under load, a counterweight boom 710 is provided that extends outwardly and rearwardly from a lower rear-facing surface of the arms 180. As depicted, the boom includes two lateral members that extend downwardly and rearwardly in FIG. 40. The two lateral members are joined by a crossmember that includes a plurality of rods extending upwardly and outwardly therefrom for receiving counterweights 712. The lower end of the boom 710 can be received at a lower end by stops 714 that extend rearwardly from the base of the system 700. Thus, a suitable amount of counterweight can be added by an operator so as to counterbalance the load of the container 600.

Figure 43A:
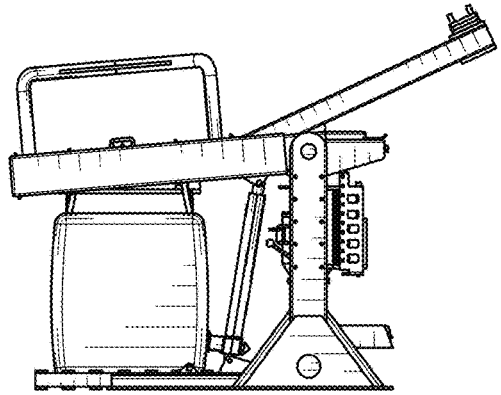
FIG. 43A-FIG. 43F are right side plan views of the bulk container discharge apparatus of FIG. 39 in various positions during operation.
Figure 43B:
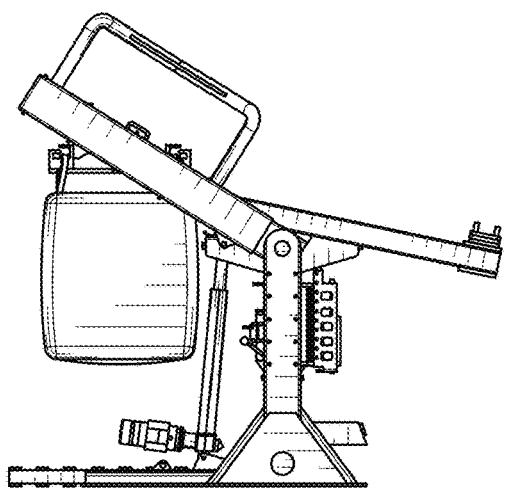
Figure 43C:
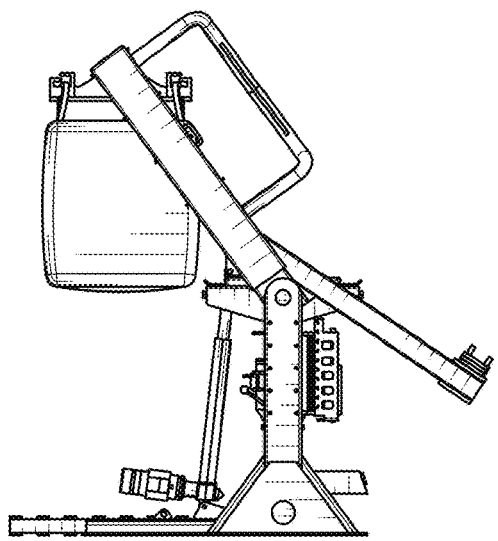
Figure 43D:
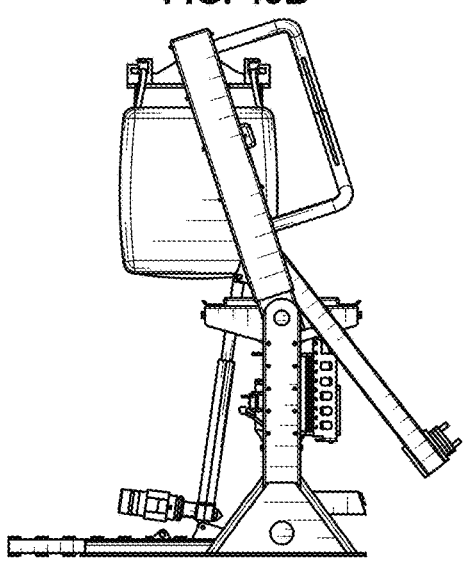
Figure 43E:
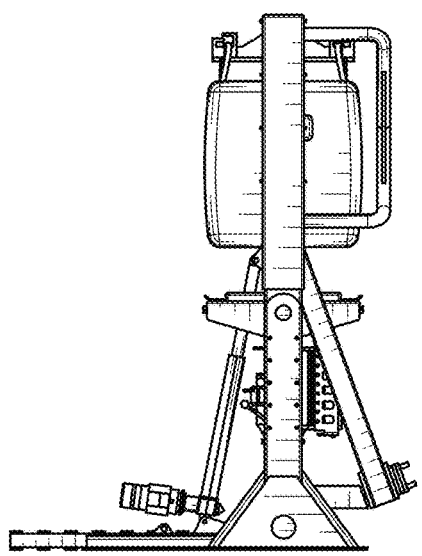
Figure 43F:
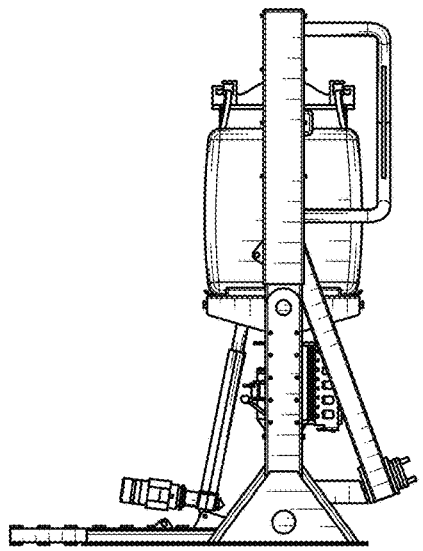

FIGS. 43A-43F illustrate device 700 in various progressive states of operation from picking up a container to depositing the container on the bag pan for emptying. FIG. 43A shows the device 700 with the arms 180 in a downward position where they are coupled to a container by way of yoke 200 as discussed elsewhere herein. The yoke 200 is movable along arms 180 by way of actuators 214 (whether hydraulic, pneumatic, or motorized), and the arms 180 are movable by way of actuator 190. The actuator is preferably coupled to a programmable logic controller or other controller, as well as the control for the valves that direct compressed air into pistons 214 (or hydraulic cylinders, or electrical drive units, as appropriate). The system controller preferably synchronizes the movement of the pistons 214 by increasing the pressure to achieve stepwise movement of the yoke. For example, when using pneumatic cylinders, simply opening the valve to each cylinder and injecting compressed gas can result in notably different heights of the ends of the yoke 200, resulting in racking of the mechanism. Thus, the system 700 (or 100) can inject gas into each cylinder 214 on each side until that cylinder reaches a stepwise increment as measured by a position sensor (e.g., linear potentiometer). This can be done, for example, by injecting a predetermined quantity of gas into each cylinder, and waiting for each cylinder to reach a predetermined replacement before more gas is injected into each cylinder. This approach is of particular advantage in pneumatic cylinders since the working fluid is compressible. Metering the delivery of gas to each cylinder in this way can help ensure that the yoke is kept level or almost level while it is being raised. This process can be repeated when lowering the container on to the bag pan, for example, or when lifting the bag while it is being emptied.

As seen in FIGS. 43A-43F, the yoke can be brought into a position along arms 180 that is no closer to the ends of the arms and no further from the bag pan than is absolutely necessary to permit the container 600 to be lifted off the skid and clear past the bag pan. This requires a synchronized series of movements between the yoke and cylinders 214, as well as the linear actuator 190. A compound motion of the yoke results in a plane that is parallel to the side of the system 700, wherein the centerpoint of the axle of the yoke traces out movements in two dimensions that are needed to permit the bag to clear the bag pan, but go no further from the bag pan than needed so as to reduce the amount of force required on the part of the actuator 190 to lift the container past the bag pan. This also facilitates the use of one actuator 190 on a single side of the device rather than a linear actuator on both sides of the device.

Figure 42A:
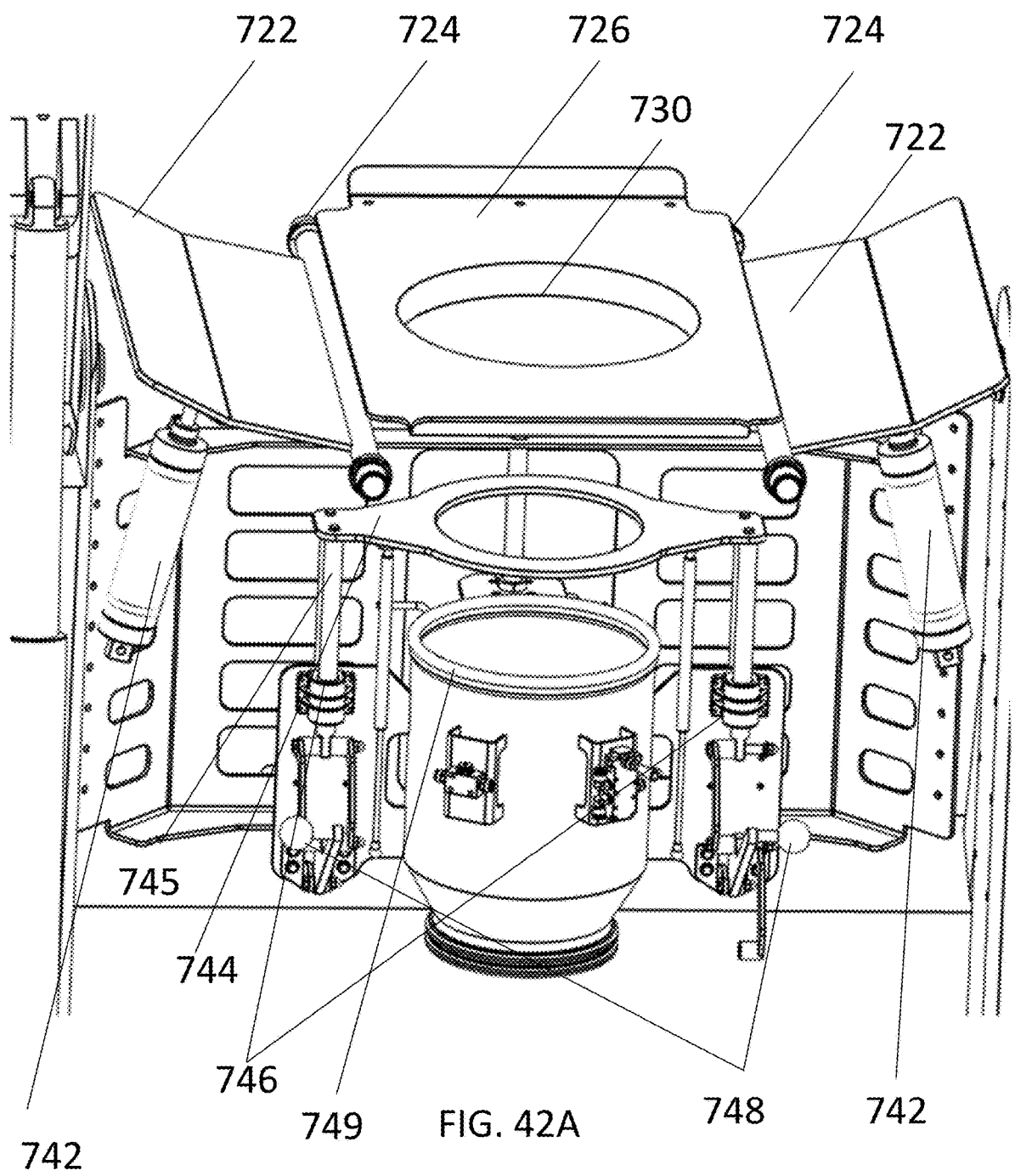
Figure 42B:
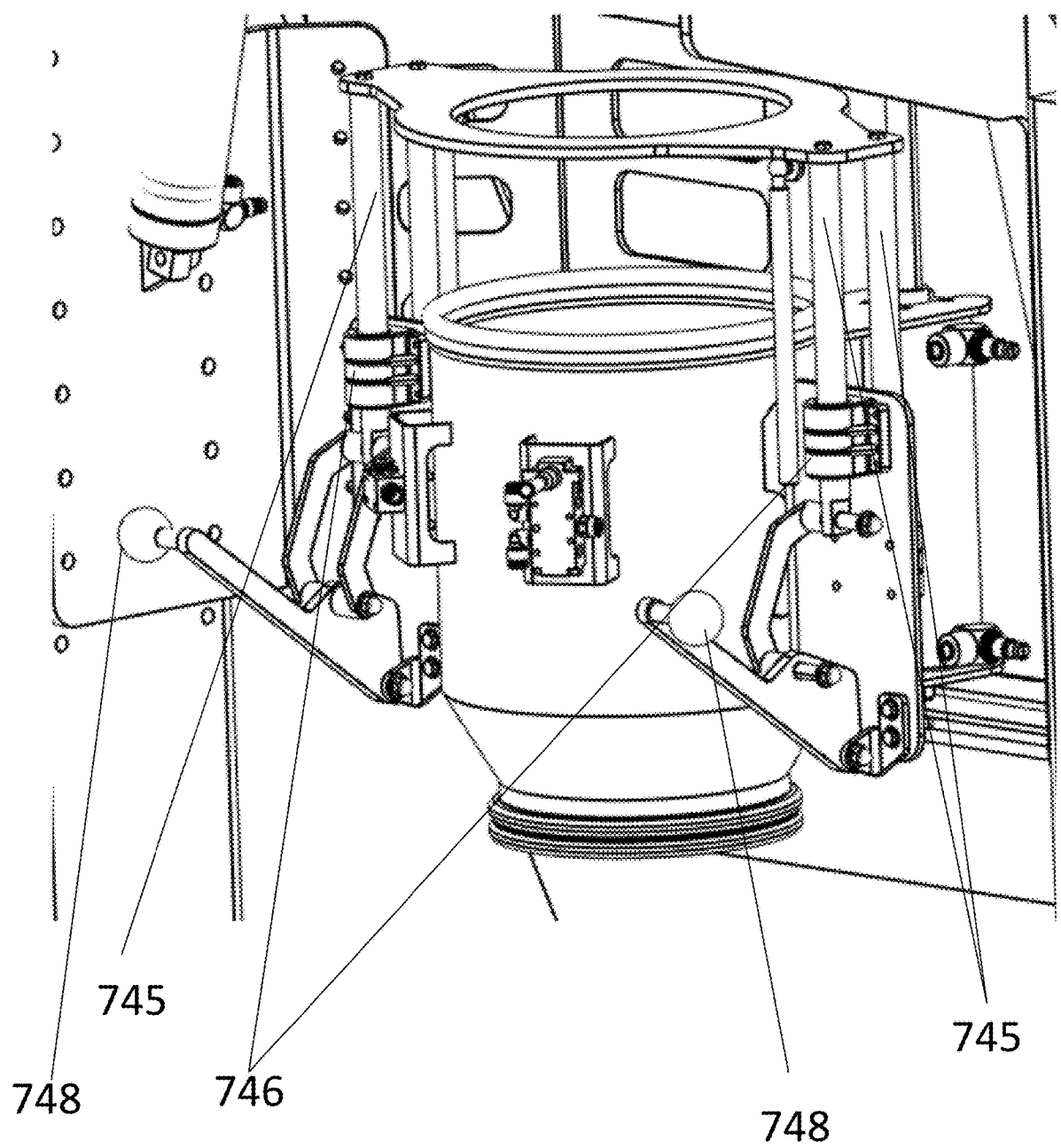

With the benefit of the foregoing explanation, and with reference to FIGS. 42A-42C, the bag pan 140 of FIG. 13 can be modified to include articulable side portions, or wings, 722. Side portions 722 are coupled to a main portion 726 of bag the pan by way of a pivoted joint or hinge 724. The side portions 722 are pivotally coupled to articulable cylinders 742, such as hydraulic cylinders that are attached at one (e.g., upper) end to the side portion 722, and at a second (e.g. lower) end to a stationary frame of the system 700. Cylinders 742 can be connected to a controller, such as the PLC to synchronize the movements of the cylinders 742 with other components of the system. Side portions 722 remain in a lower, nearly horizontal position as shown in FIG. 42A until they receive a container 600. While the container 600 is later being emptied, the cylinders 742 can be actuated, causing the side portions 722 to articulate upwardly about the pivot or hinge 724 to help direct contents of the container 600 toward the middle and thus the exit of the container through opening 730 of the bag pan. The process of articulating the cylinders 742 to raise the side portions 722 can be synchronized with upward movement of the yoke by way of cylinders 214 and accompanying sensors to help effectuate efficient emptying of the container as illustrated with respect to FIGS. 37A and 37B.

Moreover, as further illustrated in FIGS. 42A-C, a vertically displaceable collar 744 is provided defining an opening through a center thereof for receiving an exit nozzle of the container 600 therethrough. Collar 744 is coupled to four vertical rails 745 that are in turn received by four journals 746, two facing the front of device 700, and four facing the back of the device 700. The collar can be moved from an upper position to a lower position by articulating handles 748. If desired, additional stabilizers 747 or position sensors or load sensors (coupled to the PLC) can be provided to detect the vertical position of the collar 744. When a container 600 is loaded into the system to be emptied, the nozzle tube is untied at the bottom of the container 600 and directed through the opening of collar 744 and brought down against an upper peripheral end 749 of a tubular nozzle or chute. Handles 748 can be actuated to clamp collar 744 against the upper end 749, holding the container in place. After this, the container can be emptied. As the container 600 is pulled up by the yoke 200, the container will eventually empty and a force will be imparted on the collar 744. If the sensor (e.g., 747) detects that the collar is being pulled upwardly, the system can be configured to disengage the collar 744 to release the nozzle of the container 600.

It will be apparent to those skilled in the art that various modifications and variations can be made in the disclosed devices and methods without departing from the scope of the disclosure. Other aspects of the disclosure will be apparent to those skilled in the art from consideration of the specification and practice of the features disclosed herein. It is intended that the specification and examples be considered as illustrative only.

What is claimed is:

1. A bulk container discharge apparatus, comprising:
   a base portion;
   a platform disposed on the base portion, the platform being configured to support a bulk container;
   a yoke configured to be removably coupled to a bulk container;
   a pair of articulating arms including a first articulating arm coupled to a first end of the yoke and a second articulating arm coupled to a second end of the yoke, the pair of articulating arms being configured to lift the yoke supporting the bulk container along an articulation path that is at least partially vertical and at least partially horizontal from a lower position to an upper position to locate the bulk container over the platform when in the upper position to facilitate discharging the contents of the bulk container, each said articulating arm defining an elongate volume therein surrounded by a housing, each said articulating arm further including:
   a first joint that is pivotally coupled to the base portion along a first pivot axis;
   a linear actuator disposed within the elongate volume of each articulating arm and at least partially surrounded by the housing, each linear actuator being pivotally coupled to the yoke; and
   an articulation drive coupled to the base portion and to at least one of the articulating arms, the articulation drive being configured to expand in linear length to push upwardly on at least one of the articulating arms to push the at least one articulating arm upwardly from a horizontal orientation into a vertical orientation about the first joint.

2. A bulk container discharge apparatus of claim 1, wherein an upper end of the articulation drive is pivotally connected to a front side of the at least one of the articulating arms and a lower end of the articulation drive is pivotally connected to the platform in front of the at least one of the articulating arms.

3. A bulk container discharge apparatus of claim 1, wherein the yoke and each said linear actuator are joined through an elongate slot defined through the housing at a yoke pivot location that is disposed between a first end of the elongate slot that is closer to the first joint and a second end of the elongate slot that is relatively further away from the first joint.

4. The bulk container discharge apparatus of claim 3, wherein the elongate slot is defined along surfaces of a wall of each of the articulating arms that face each other.

5. The bulk container discharge apparatus of claim 3, wherein each linear actuator is configured to expand in length to cause the yoke pivot location to move along the elongate slot toward the second end of the elongate slot as the articulating arms approach the vertical orientation.

6. The bulk container discharge apparatus of claim 1, wherein movement of the linear actuator occurs fully within the housing.

7. The bulk container discharge apparatus of claim 1, further comprising:
a processor operably coupled to each linear actuator, the processor being configured to synchronize the vertical movement of each of the linear actuators to maintain the bulk container in a level condition; and
a plurality of linear position sensors operably coupled to the processor that are configured to detect the vertical position of the yoke, wherein the processor is configured to recognize when the yoke is not level.

8. The bulk container discharge apparatus of claim 1, further comprising a vibrator coupled to the platform, the vibrator being configured to induce mechanical vibration in the platform to facilitate emptying of the bulk container; and
at least one vibration isolator coupling the platform to the base portion to limit vibration from the vibrator from traveling to the base portion.

9. The bulk container discharge apparatus of claim 1, wherein the articulation drive includes a first linear drive operably coupled to the first articulating arm and a second linear drive operably coupled to the second articulating arm.

10. The bulk container discharge apparatus of claim 1, further comprising a controller operably coupled to an articulable support disposed underneath the bulk container when the bulk container is in the upper position wherein the controller is programmed to articulate the articulable support underneath the bulk container to push up on the bottom of the bulk container to cause material to flow toward an exit of the bulk container.

11. The bulk container discharge apparatus of claim 1, further comprising a controller operably coupled to each linear actuator and the articulation drive, wherein the controller is programmed to adjust the articulation path in a two-dimensional plane that is parallel to a lateral side of the bulk container discharge apparatus, wherein the articulation path is adjusted to maintain minimal stress on the articulation drive by maintaining the bulk container in a close positional relationship to the device while it is being lifted.

12. The apparatus of claim 1, further comprising a counterweight operably coupled to at least one of the articulating arms configured to counteract the weight of a bulk container to reduce load on the articulation drive.

13. The apparatus of claim 1, further comprising a stabilization frame coupling the first articulating arm to the second articulating arm.

14. A bulk container discharge apparatus of claim 1, wherein each said linear actuator has a lower stationary end and an upper movable end, wherein the upper movable end of each said linear actuator is coupled to the yoke.

15. A bulk container discharge apparatus of claim 14, wherein each said linear actuator does not extend upwardly beyond the yoke when the yoke is in the upper position.

16. The bulk container discharge apparatus of claim 1, wherein the bulk container includes a bulk bag including a plurality of loops disposed proximate an upper surface of the bulk bag.

17. A bulk container discharge apparatus, comprising:
a base portion;
a platform disposed on the base portion, the platform being configured to support a bulk container;
a yoke configured to be removably coupled to a bulk container;
a pair of articulating arms, each said articulating arm having a first portion that is pivotally coupled to the base portion at a first pivot axis, and a second portion pivotally coupled to the yoke, the pair of articulating arms being configured to lift the yoke bearing the bulk container along an articulation path that is at least partially vertical from a lower position in front of the platform to an upper position to locate the bulk container over the platform when in the upper position to facilitate discharging the contents of the bulk container, wherein the pair of articulating arms are configured to adjust a length between the yoke and first pivot axis while the yoke is lifted by the pair of articulating arms along the articulation path; and
an articulation drive coupled to the base portion and to at least one of the articulating arms, the articulation drive being configured to articulate said at least one of the articulating arms about the first pivot, wherein an upper end of the articulation drive is pivotally connected to a front-facing side of said at least one of the articulating arms and a lower end of the articulation drive is pivotally connected to the platform at a location that is in front of said at least one of the articulating arms such that expansion of the articulation drive in length causes the pair of articulating arms to move upwardly and in a direction toward the platform while the yoke is being lifted from the lower position to the upper position.

18. The bulk container discharge apparatus of claim 17, further comprising:
a processor operably coupled to the articulation drive, the processor being configured to synchronize a change in length between the yoke and first pivot axis to maintain the bulk container in a level condition; and
a plurality of linear position sensors operably coupled to the processor that are configured to detect the vertical position of the yoke, wherein the processor is configured to recognize when the yoke is not level.

19. The bulk container discharge apparatus of claim 17, further comprising a vibrator coupled to the platform, the vibrator being configured to induce mechanical vibration in the platform to facilitate emptying of the bulk container; and
at least one vibration isolator coupling the platform to the base portion to limit vibration from the vibrator from traveling to the base portion.

20. The bulk container discharge apparatus of claim 17, wherein the articulation drive includes a first linear drive operably coupled to a first articulating arm of the plurality of articulating arms and a second linear drive operably coupled to a second articulating arm of the plurality of articulating arms.

21. The apparatus of claim 18, further comprising:
a counterweight operably coupled to at least one of the articulating arms configured to counteract the weight of a bulk container to reduce load on the articulation drive; and
a stabilization frame coupling the articulating arms to each other.

22. The bulk container discharge apparatus of claim 17, wherein the bulk container includes a bulk bag including a plurality of loops disposed proximate an upper surface of the bulk bag.

23. A bulk container discharge apparatus, comprising:
a base portion;
a platform disposed on the base portion, the platform being configured to support a bulk container;
a yoke configured to be removably coupled to a bulk container;
a pair of articulating arms, each said articulating arm having a first portion that is pivotally coupled to the base portion at a first pivot axis, and a second portion pivotally coupled to the yoke, the pair of articulating arms being configured to lift the yoke bearing the bulk container along an articulation path that is at least partially vertical from a lower position to an upper position to locate the bulk container over the platform when in the upper position to facilitate discharging the contents of the bulk container, wherein the yoke rotates about a yoke rotation axis while it is being lifted by the pair of articulating arms, the yoke rotation axis passes through each articulating arm as the yoke is lifted from the lower position to the upper position, and the yoke rotation axis travels along the length of the pair of articulating arms as the bulk container moves from the lower position to the upper position; and
an articulation drive coupled to the base portion and to at least one arm of the pair of articulating arms, the articulation drive being configured to articulate said at least one articulating arm about the first pivot.

24. The bulk container discharge apparatus of claim 23, wherein the bulk container includes a bulk bag including a plurality of loops disposed proximate an upper surface of the bulk bag.

\* \* \* \* \*